United States Patent [19]
Bernard, II et al.

[11] Patent Number: 5,964,562
[45] Date of Patent: Oct. 12, 1999

[54] ROTATING ELEVATOR MECHANISM FOR ARTICLE TRANSFER IN AN AUTOMATED STORAGE SYSTEM

[75] Inventors: Clay Bernard, II, Point Richmond; Martin L. Wisecarver, Pittsburg; Richard A. Baldwin, Oakland; William A. Pearson, Martinez; Frank P. Steblaj, Danville, all of Calif.

[73] Assignee: Computer Aided Systems, Inc., Hayward, Calif.

[21] Appl. No.: 09/042,944

[22] Filed: Mar. 17, 1998

[51] Int. Cl.[6] ............................................ B65G 1/10
[52] U.S. Cl. .................. 414/331.03; 414/277; 414/659; 198/347.3; 198/369.1
[58] Field of Search ........................... 414/331.03, 814, 414/277, 280, 659, 660; 198/347.3, 369.1

[56] References Cited

U.S. PATENT DOCUMENTS

| | | | |
|---|---|---|---|
| 3,780,852 | 12/1973 | Weiss et al. | 414/331.03 X |
| 4,252,488 | 2/1981 | Kochanneck . | |
| 4,389,157 | 6/1983 | Bernard, II et al. | 414/787 |
| 4,561,820 | 12/1985 | Matheny, III et al. | 414/331 |
| 4,883,401 | 11/1989 | Kavieff | 414/331 X |
| 4,887,953 | 12/1989 | Greub . | |
| 4,976,580 | 12/1990 | Knakrick . | |
| 4,983,091 | 1/1991 | Lichti et al. . | |
| 4,986,715 | 1/1991 | Asakawa | 414/331 |
| 4,998,857 | 3/1991 | Paravella et al. | 414/331 |
| 5,222,855 | 6/1993 | Bernard, III et al. | 414/331.03 X |
| 5,226,782 | 7/1993 | Rigling . | |
| 5,337,880 | 8/1994 | Claycomb et al. . | |
| 5,362,197 | 11/1994 | Rigling . | |
| 5,449,262 | 9/1995 | Anderson et al. | 414/331 X |
| 5,478,182 | 12/1995 | Hildebrand et al. . | |
| 5,505,586 | 4/1996 | Lichti | 414/331 X |
| 5,588,790 | 12/1996 | Lichti | 414/331 |
| 5,634,760 | 6/1997 | Anderson et al. | 414/331 X |
| 5,641,259 | 6/1997 | Perry et al. | 414/331.33 X |
| 5,863,172 | 1/1999 | Pearson et al. | 414/331.03 |

FOREIGN PATENT DOCUMENTS

| | | | |
|---|---|---|---|
| 59-212304 | 12/1984 | Japan | 414/331 |
| 60-082508 | 5/1985 | Japan | 414/331 |
| 60-262702 | 12/1985 | Japan | 414/331 |

*Primary Examiner*—Christopher P. Ellis
*Assistant Examiner*—Gerald J. O'Connor
*Attorney, Agent, or Firm*—Fish & Richardson P.C.

[57] ABSTRACT

An apparatus for exchanging articles with an article holder includes a vertical mast having a vertical mast axis and a shuttle ring assembly. The shuttle ring assembly has a central aperture surrounding the mast and is coupled to the mast to allow the shuttle ring assembly to be translated vertically along the mast through multiple heights between a lower height and an upper height. The shuttle ring assembly includes a rotary member coupled to the mast to be rotated through multiple orientations about the mast axis. The rotary member includes multiple article-holding fixtures, angularly spaced from each other about the mast axis. The multiple orientations include a respective exchange orientation for each of the article-holding fixtures. The rotary member can be positioned in any one of the exchange orientations so that a selected one of the article-holding fixtures is in an associated exchange position. The shuttle ring assembly also includes an article transfer mechanism configured to transfer an article between the article holder and a selected one of the article-holding fixtures when the rotary member is positioned so that the selected one of the article-holding fixtures is in its associated exchange position.

33 Claims, 21 Drawing Sheets

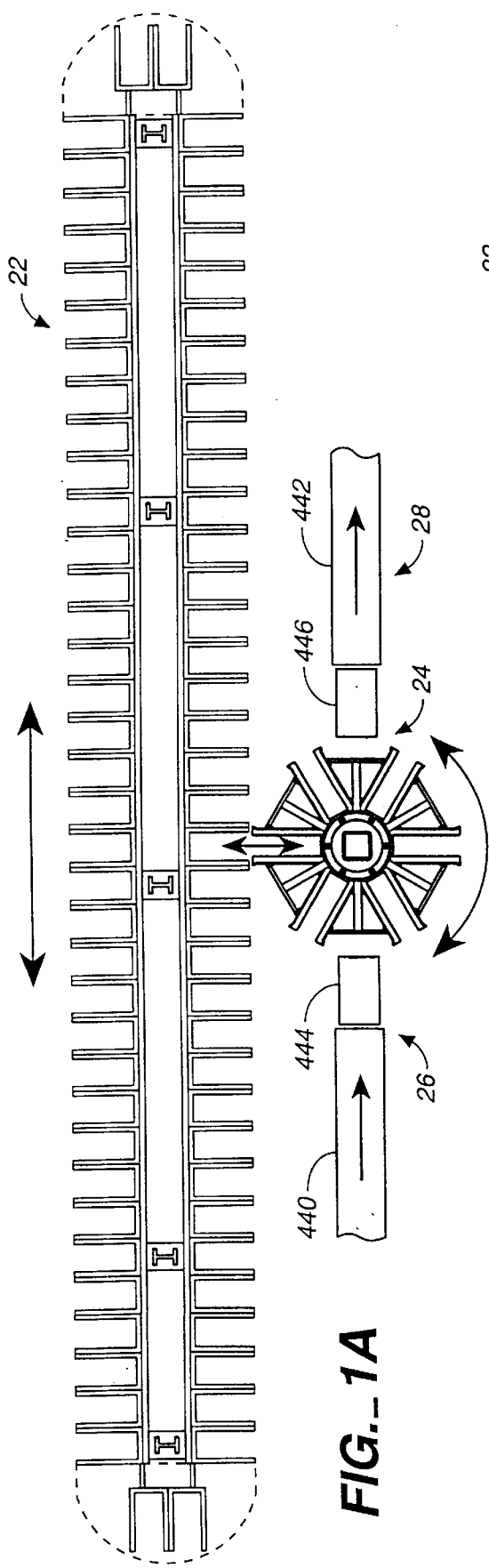
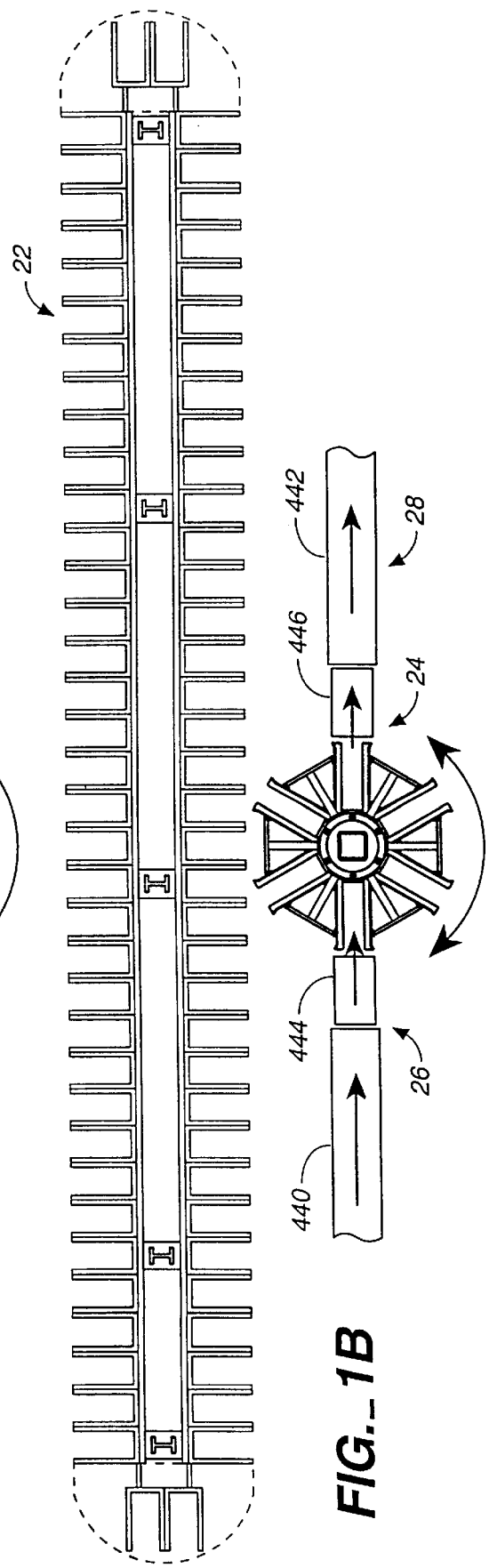
FIG._1A
FIG._1B

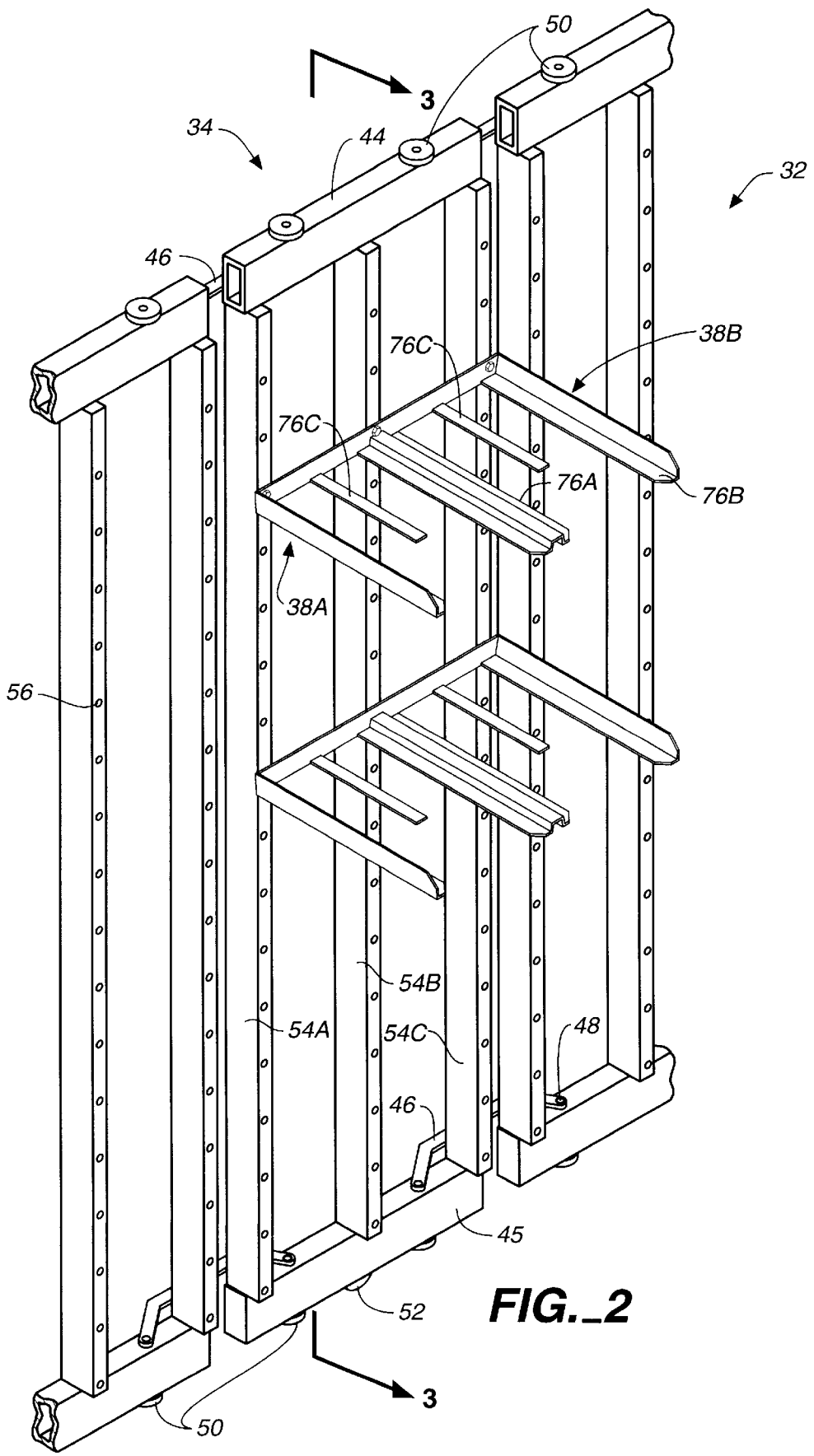
FIG._2

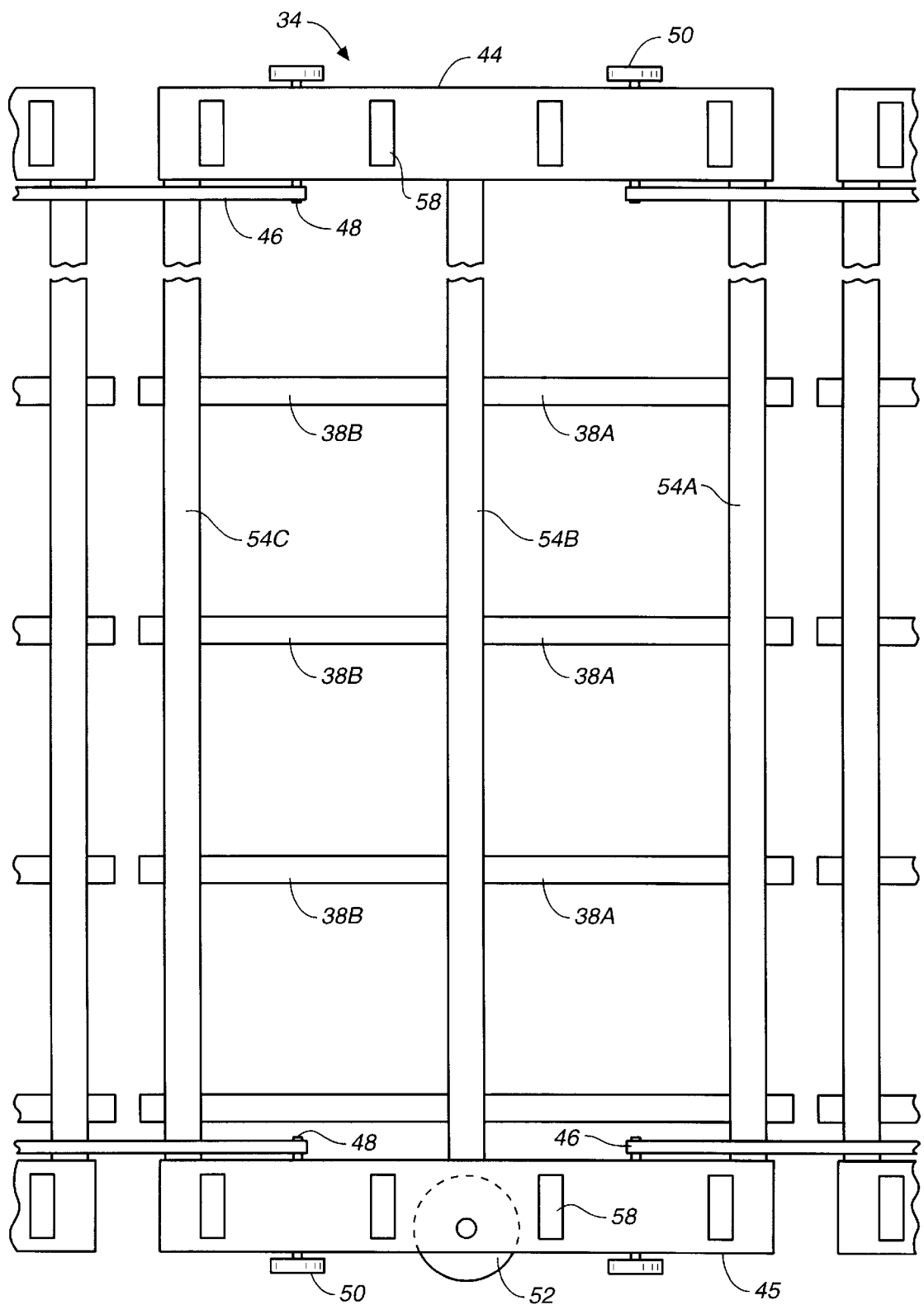
FIG._3

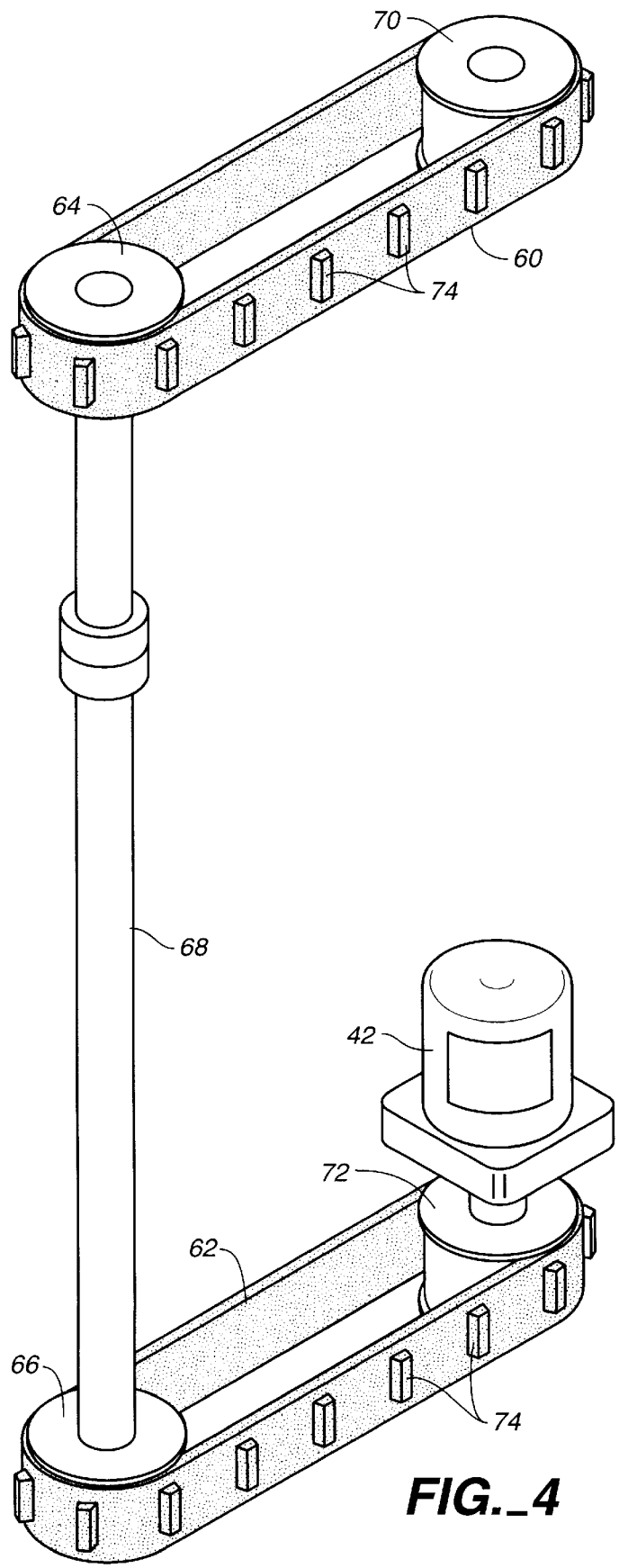
FIG._4

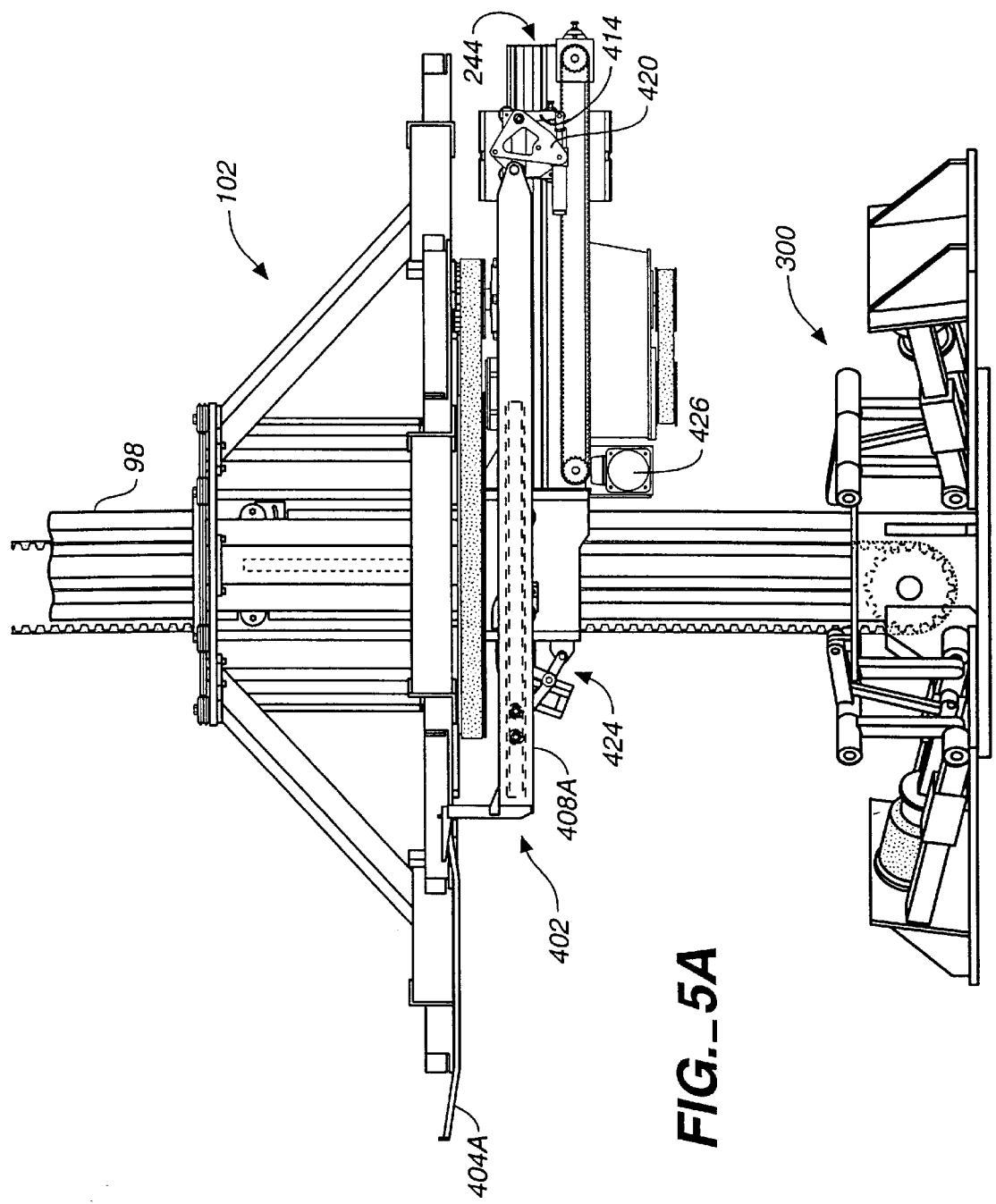

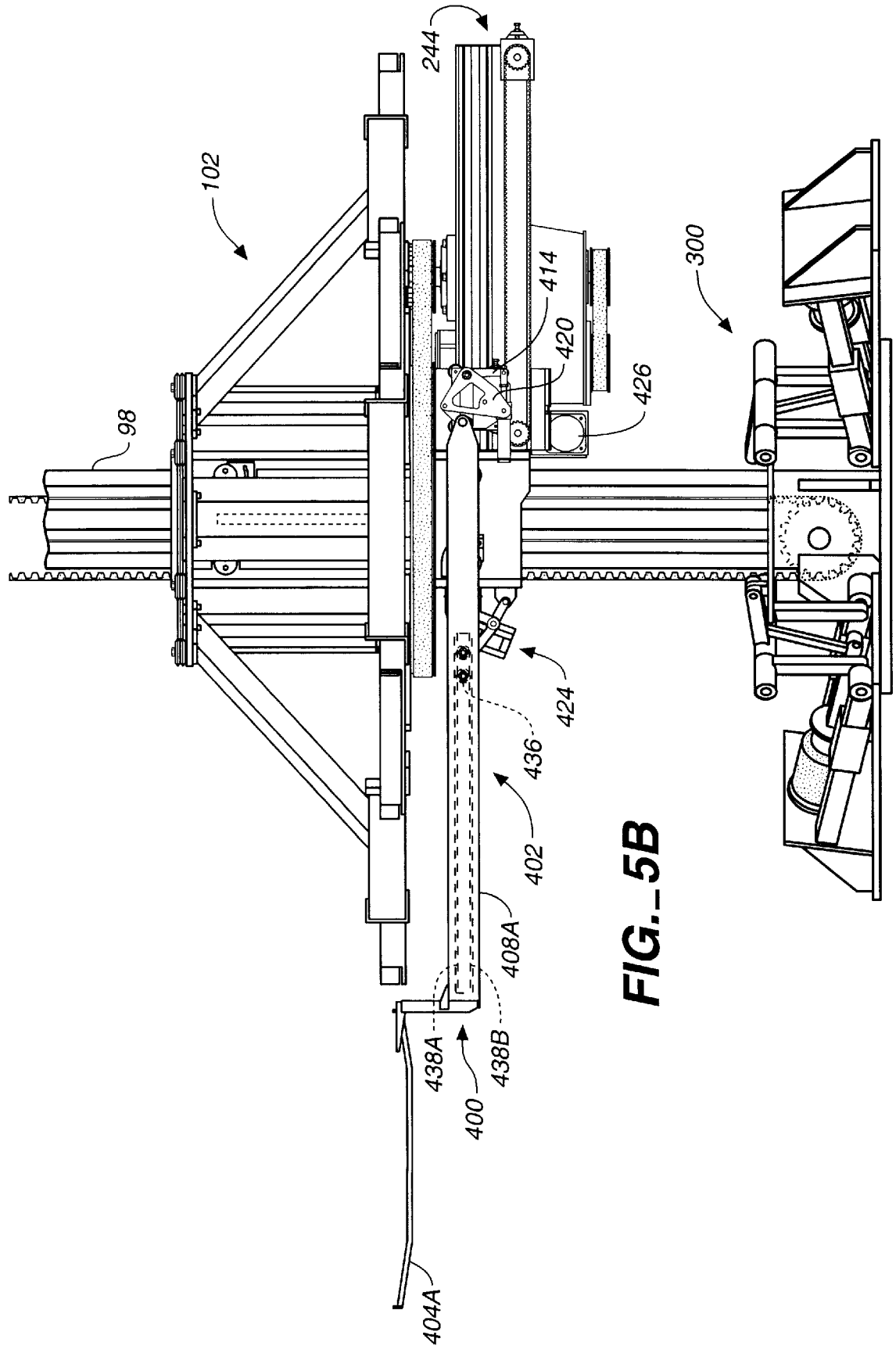

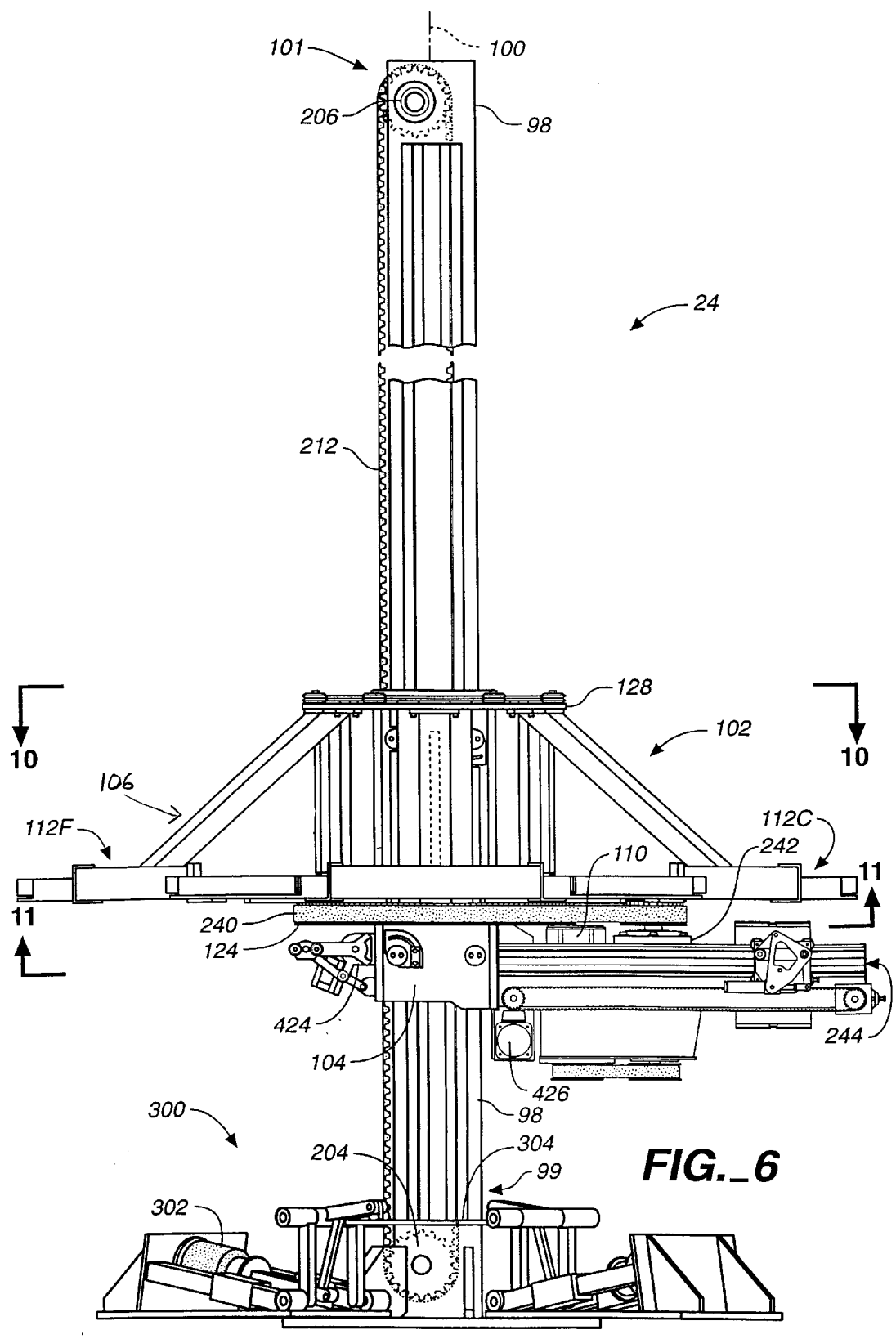
FIG._6

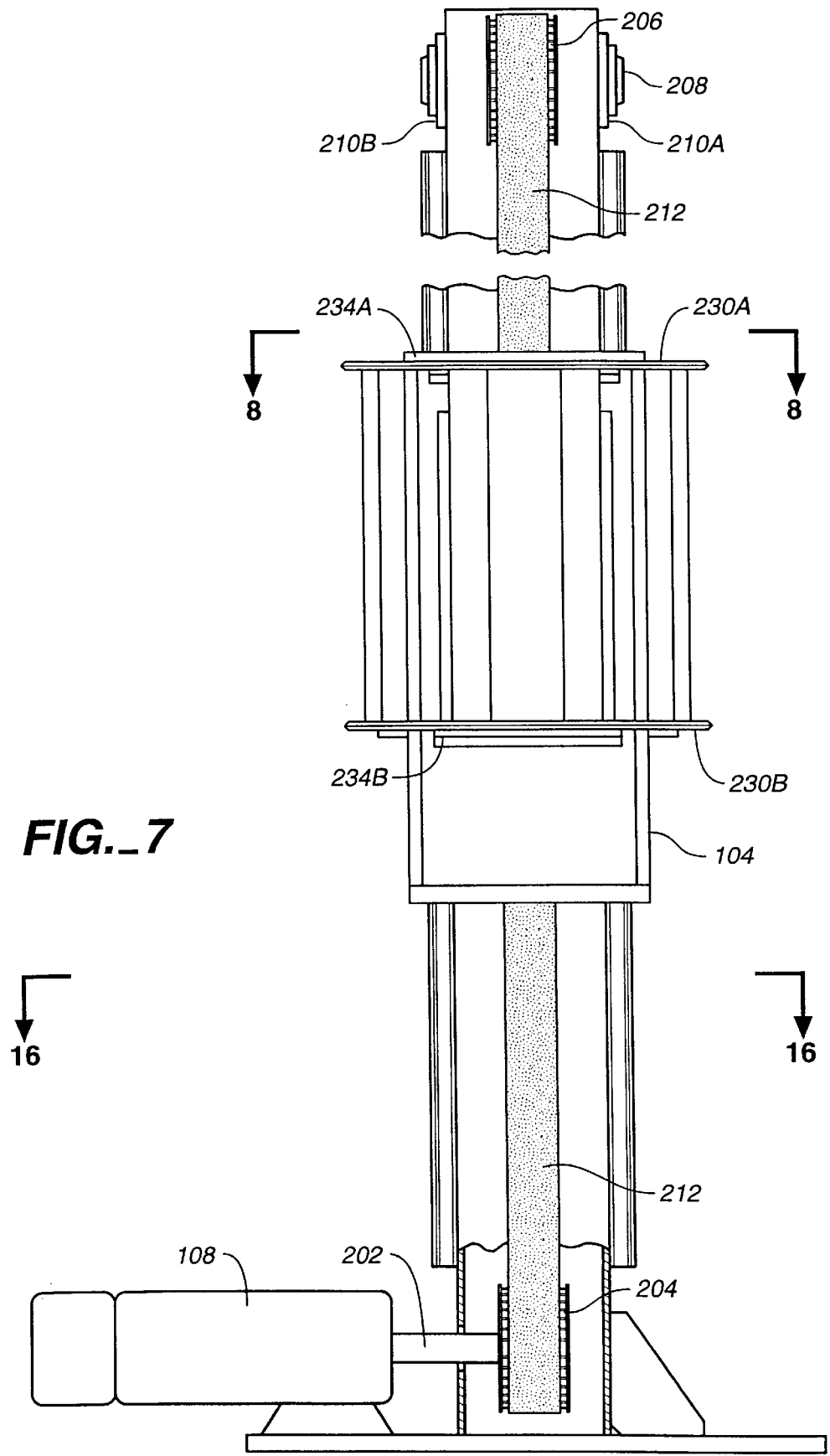
FIG._7

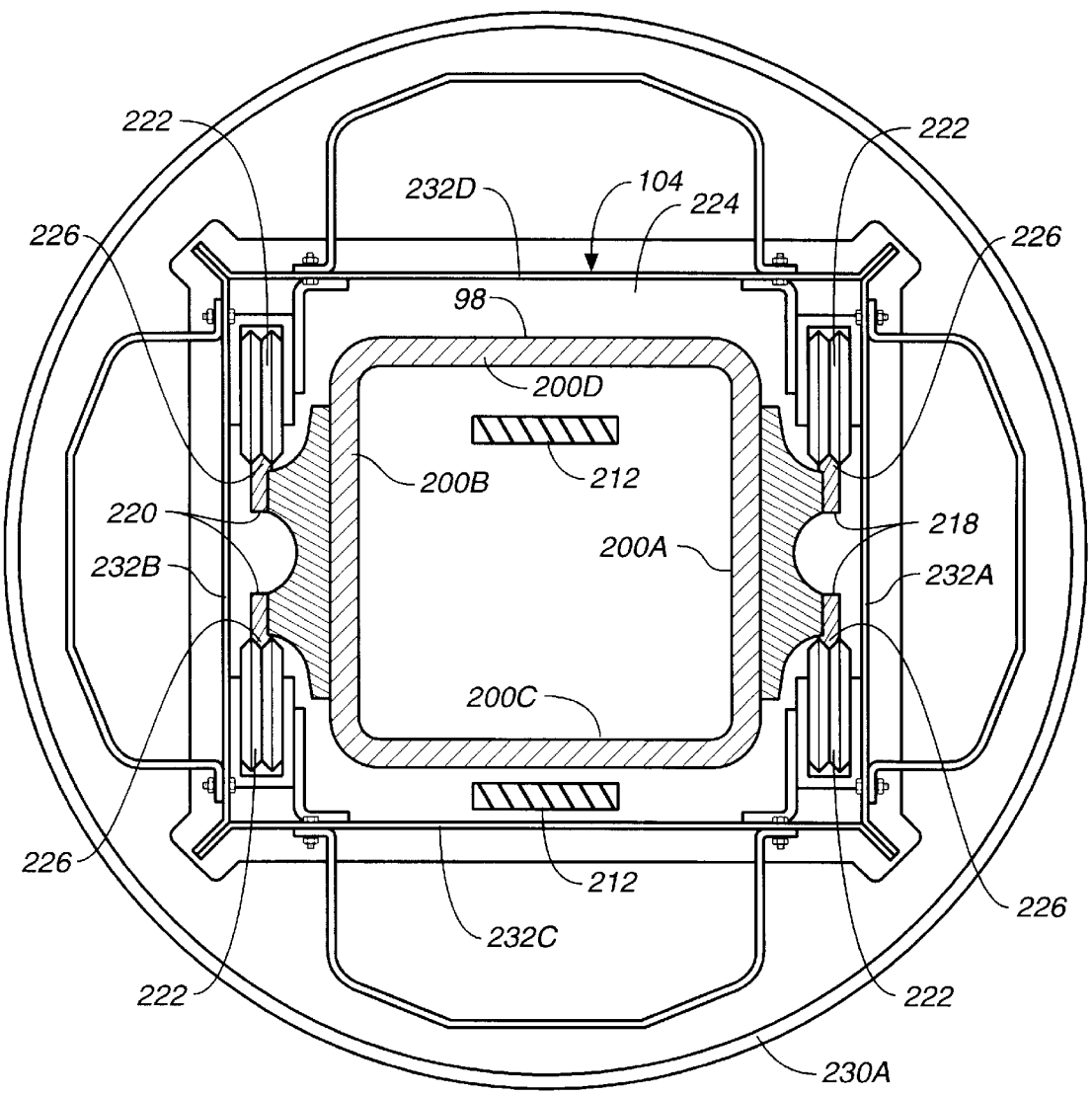
FIG._8

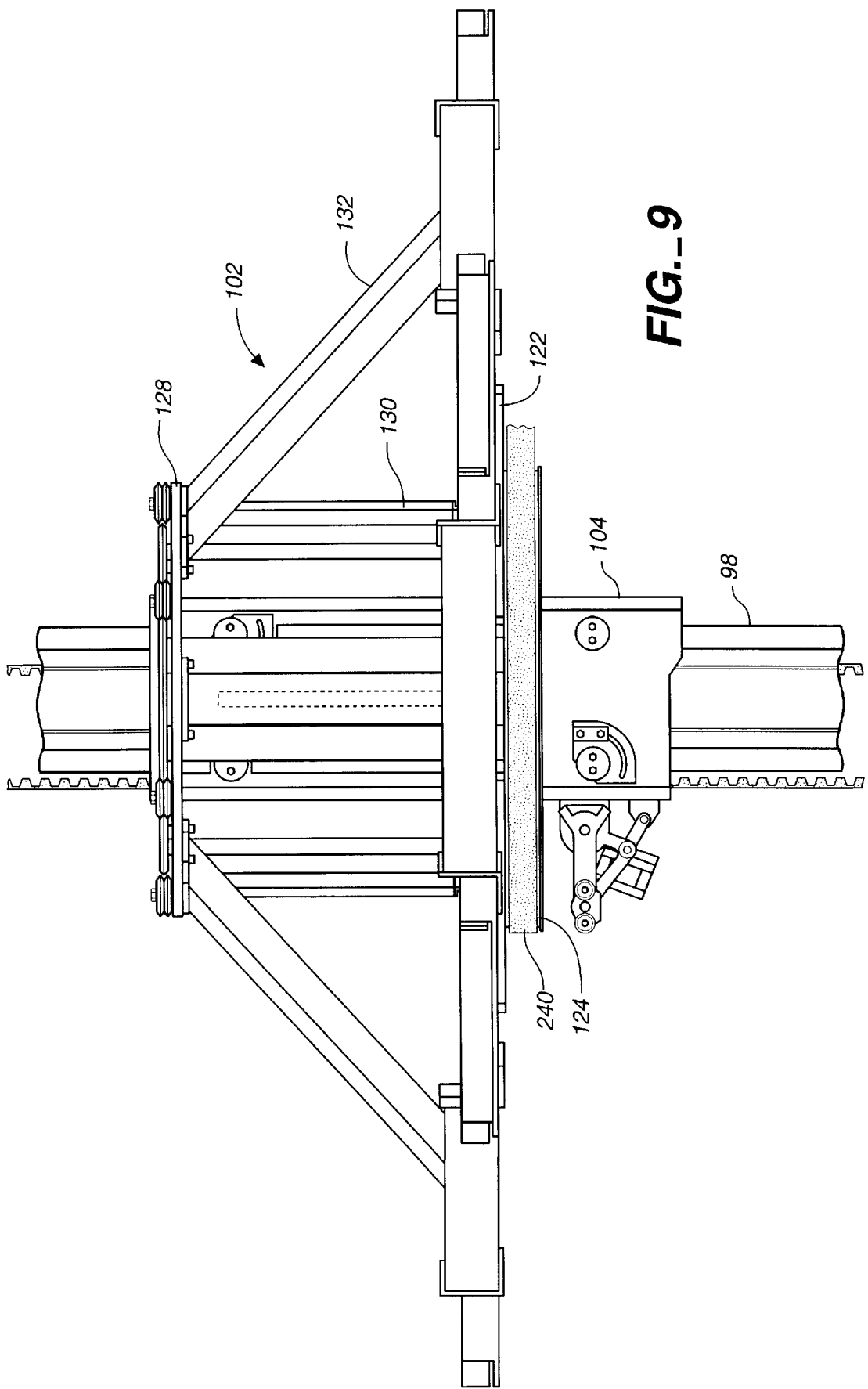

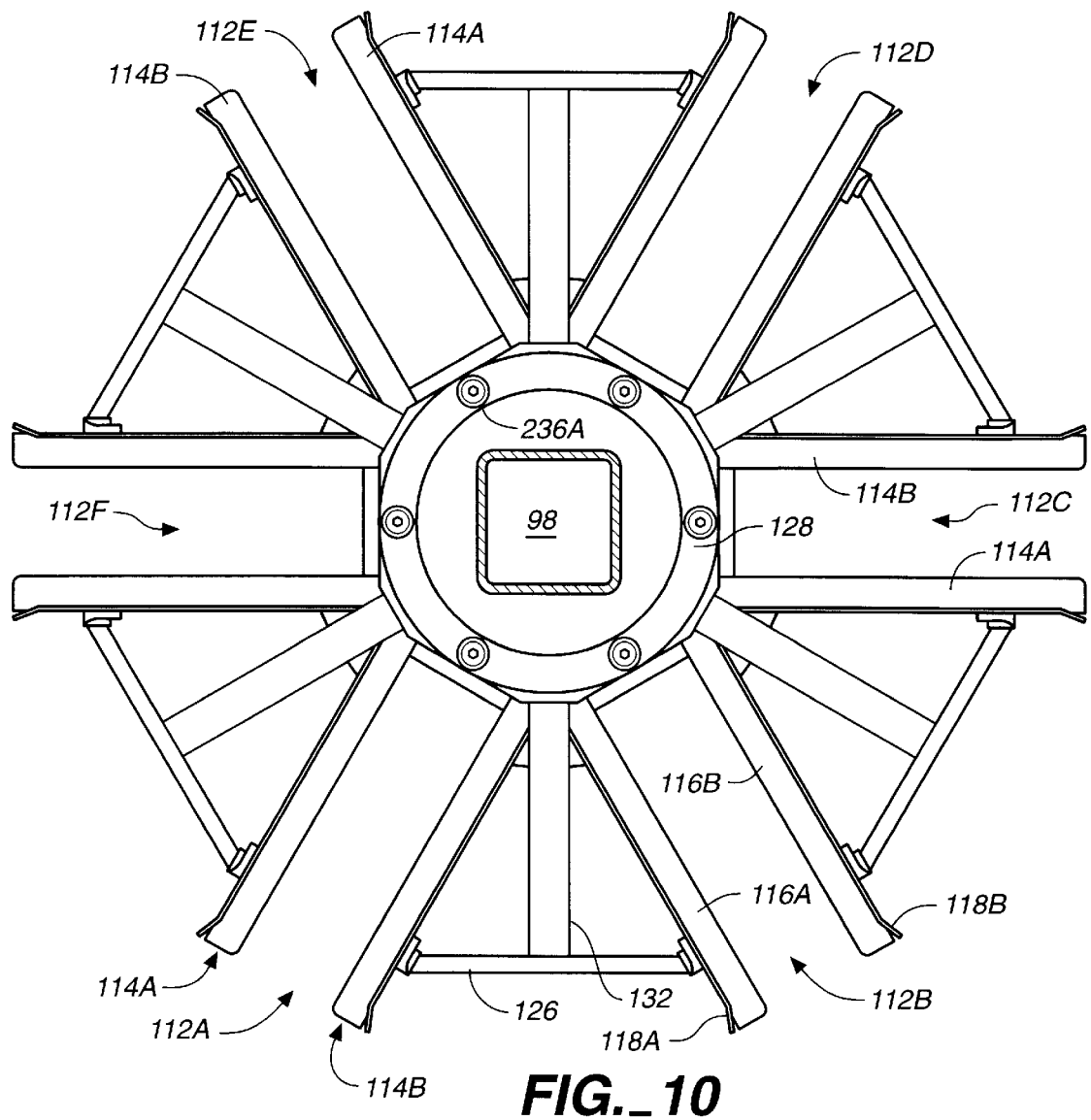
FIG._10

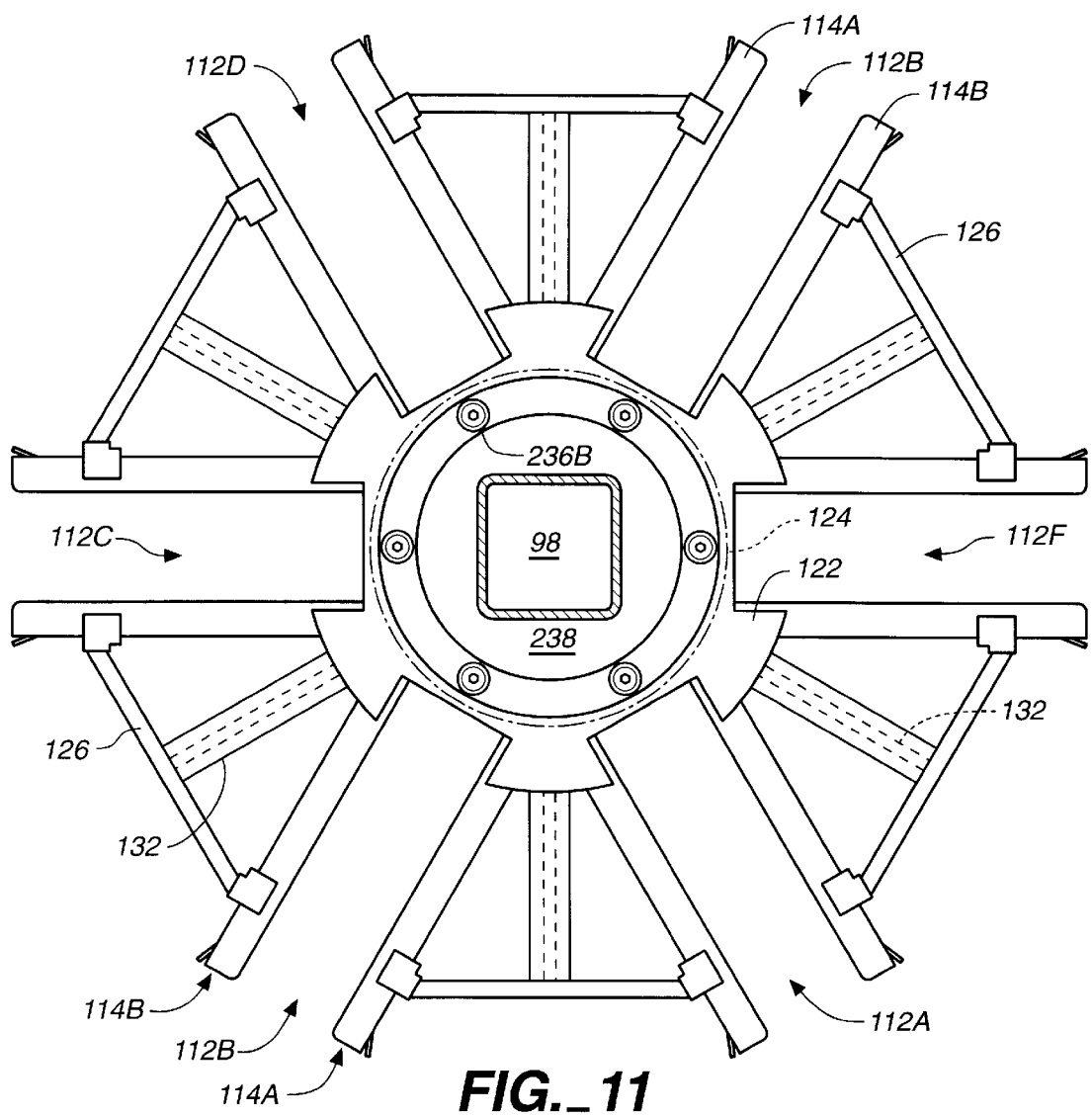
FIG._11

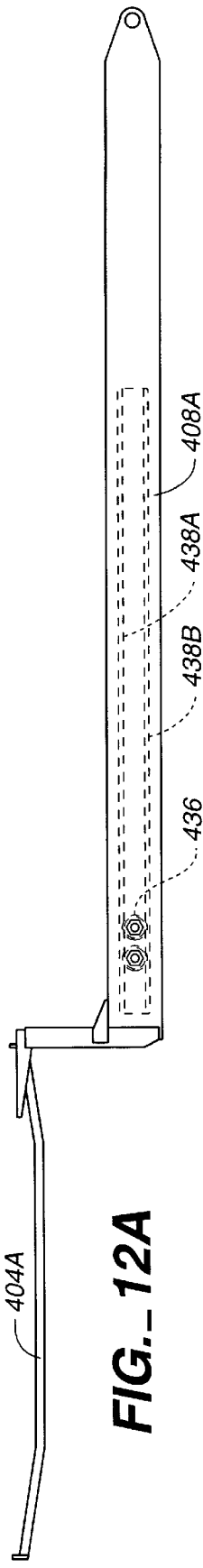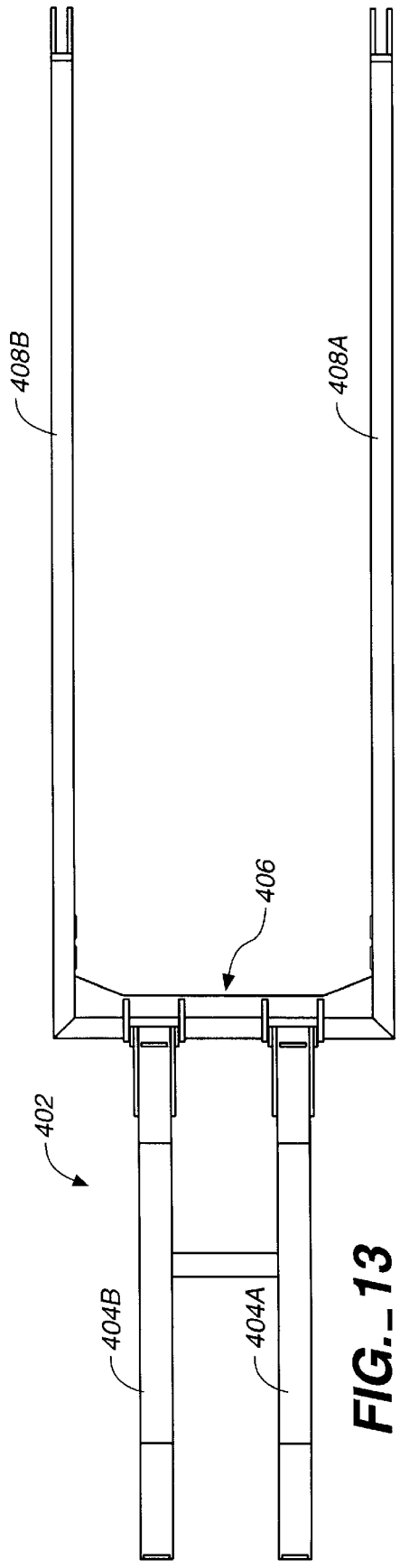

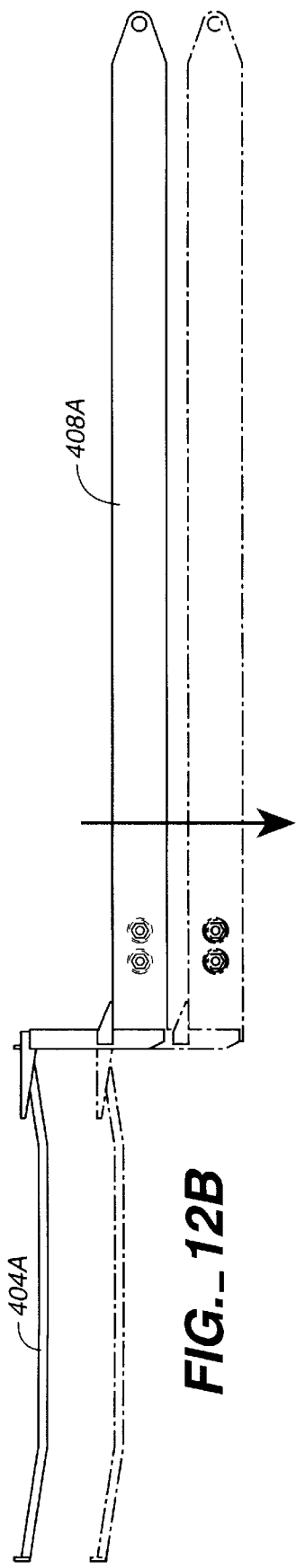
FIG._12B
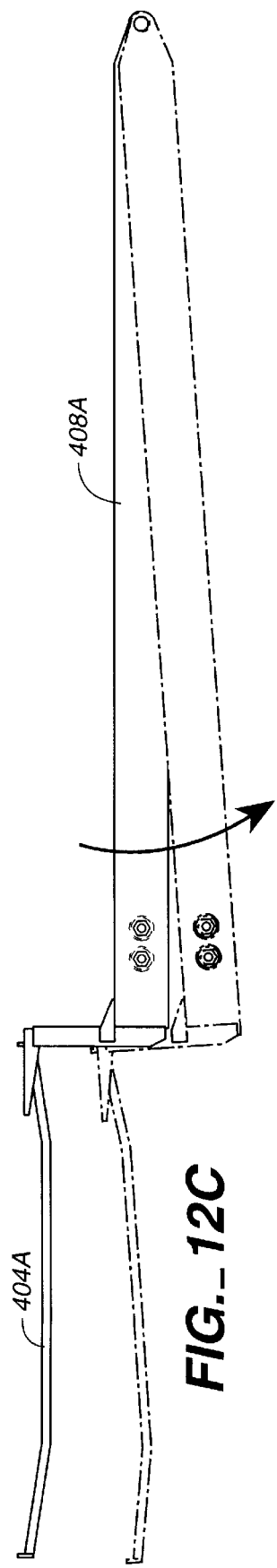
FIG._12C
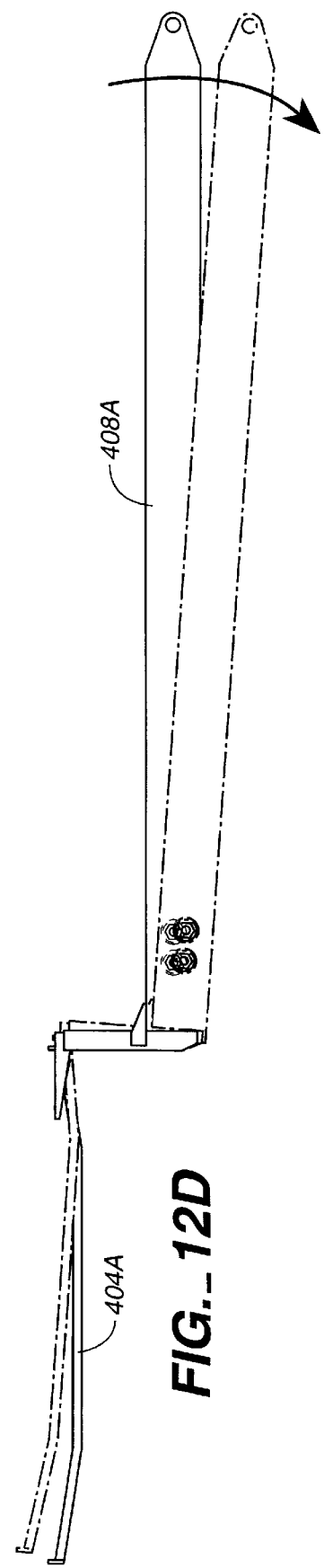
FIG._12D

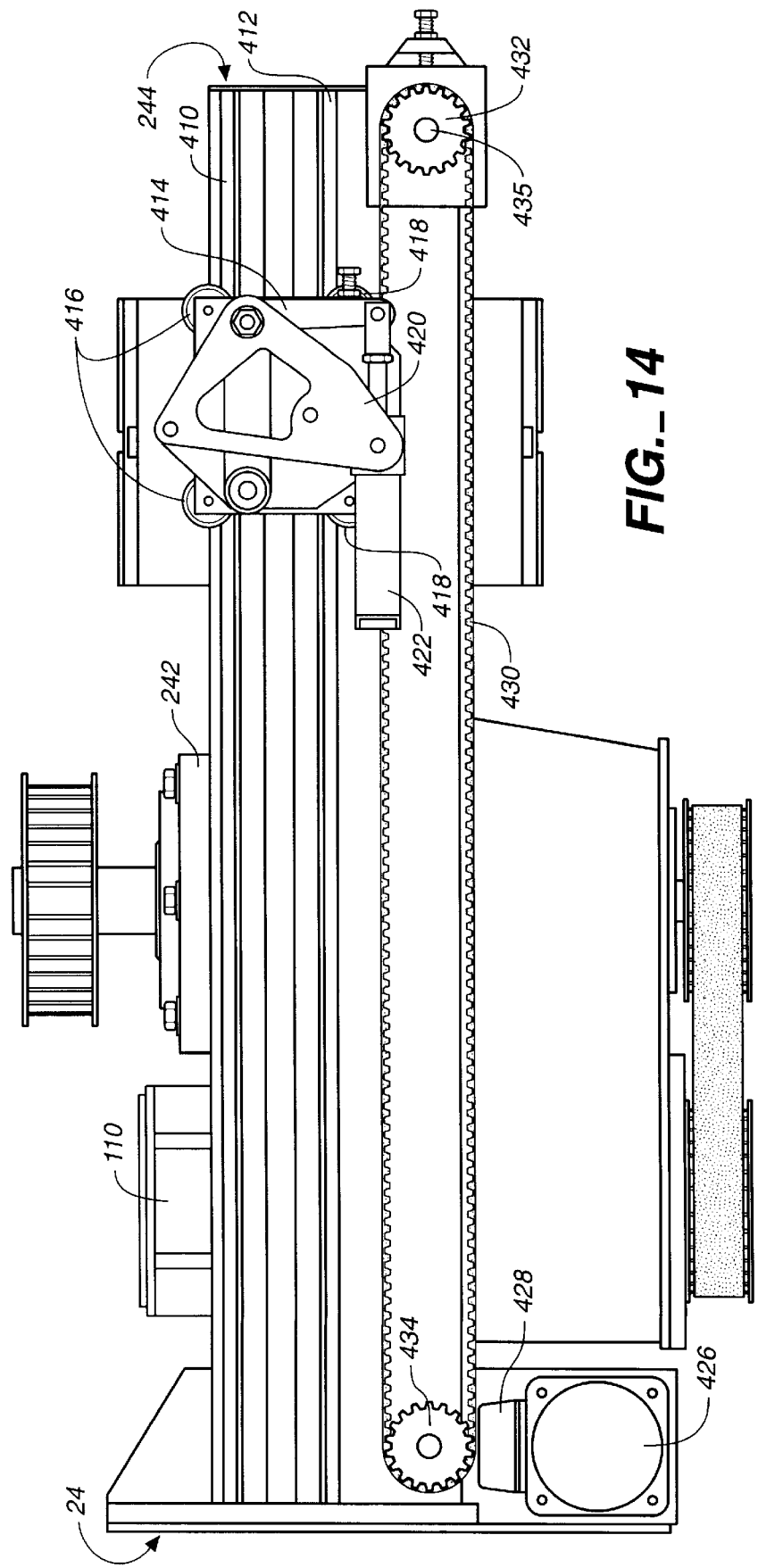

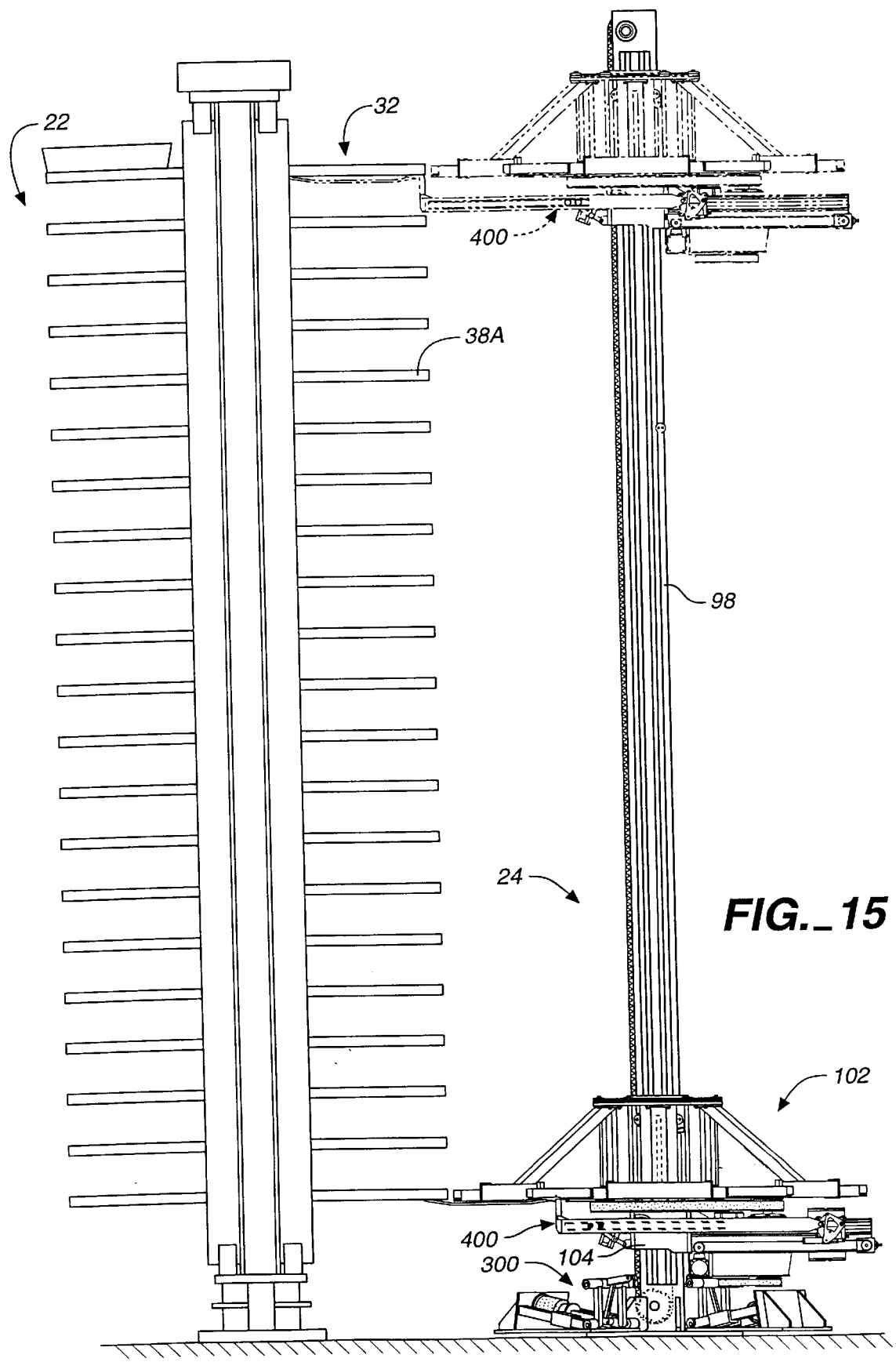
FIG._15

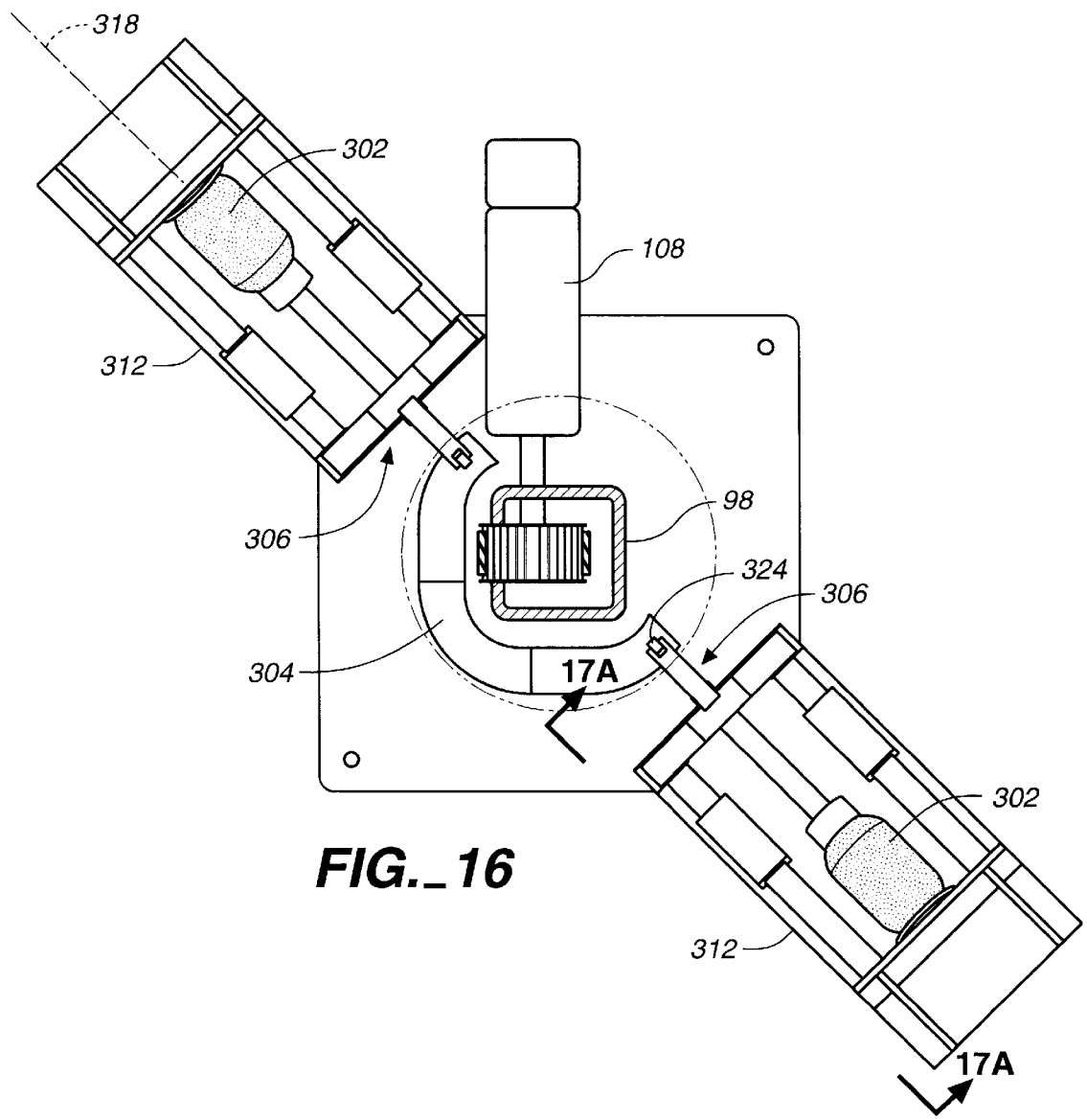
FIG._16

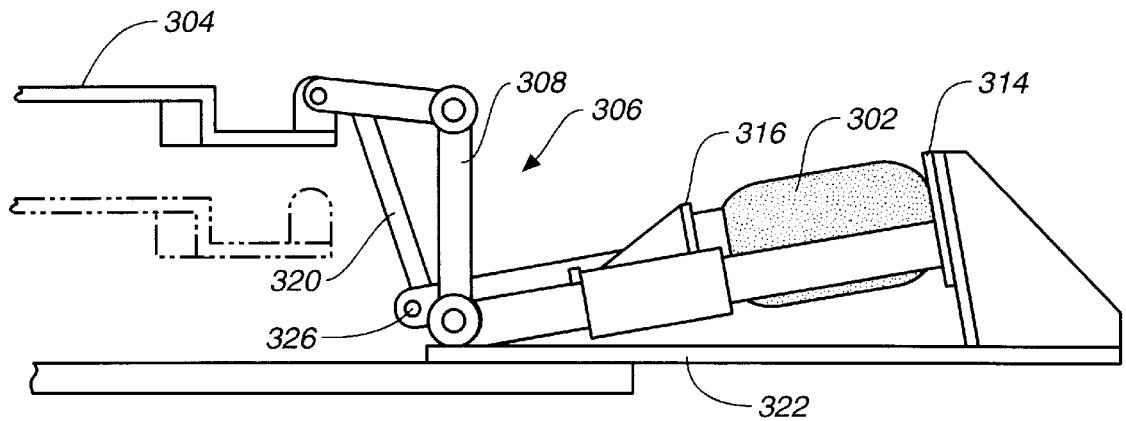
FIG._17A
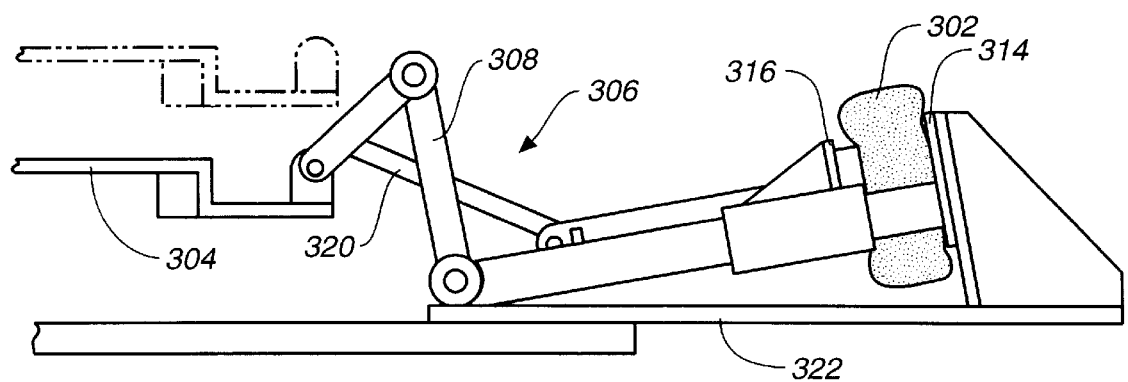
FIG._17B

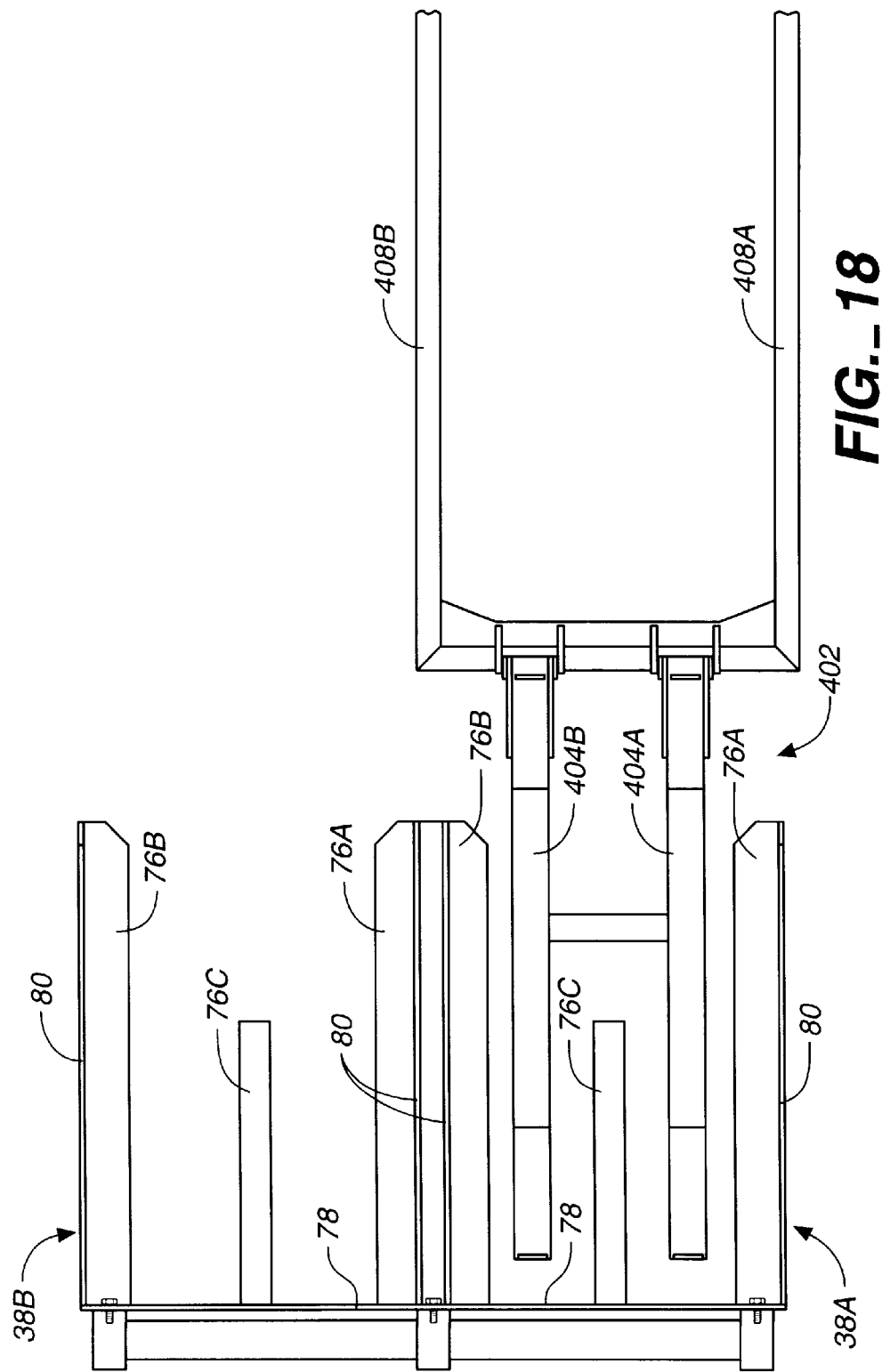

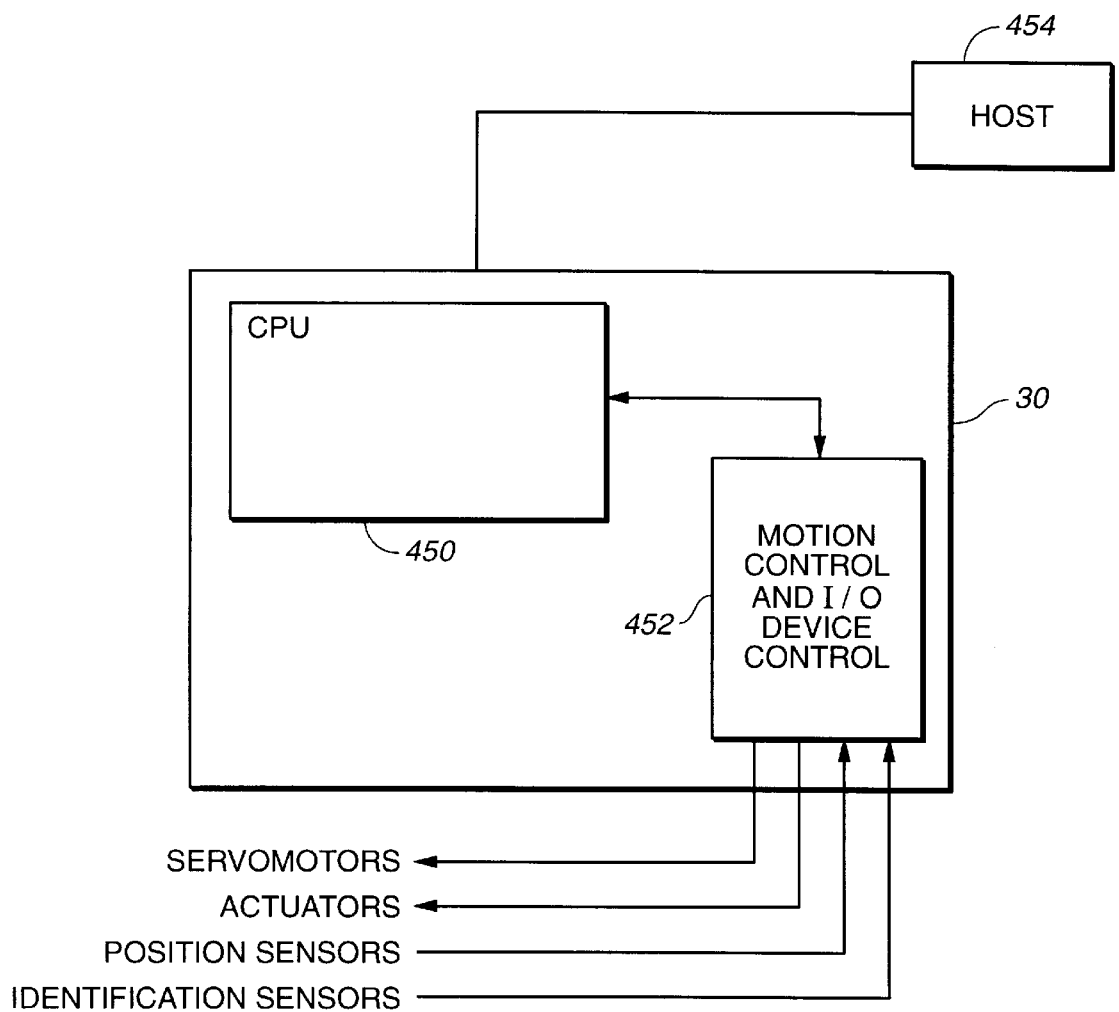
FIG._19

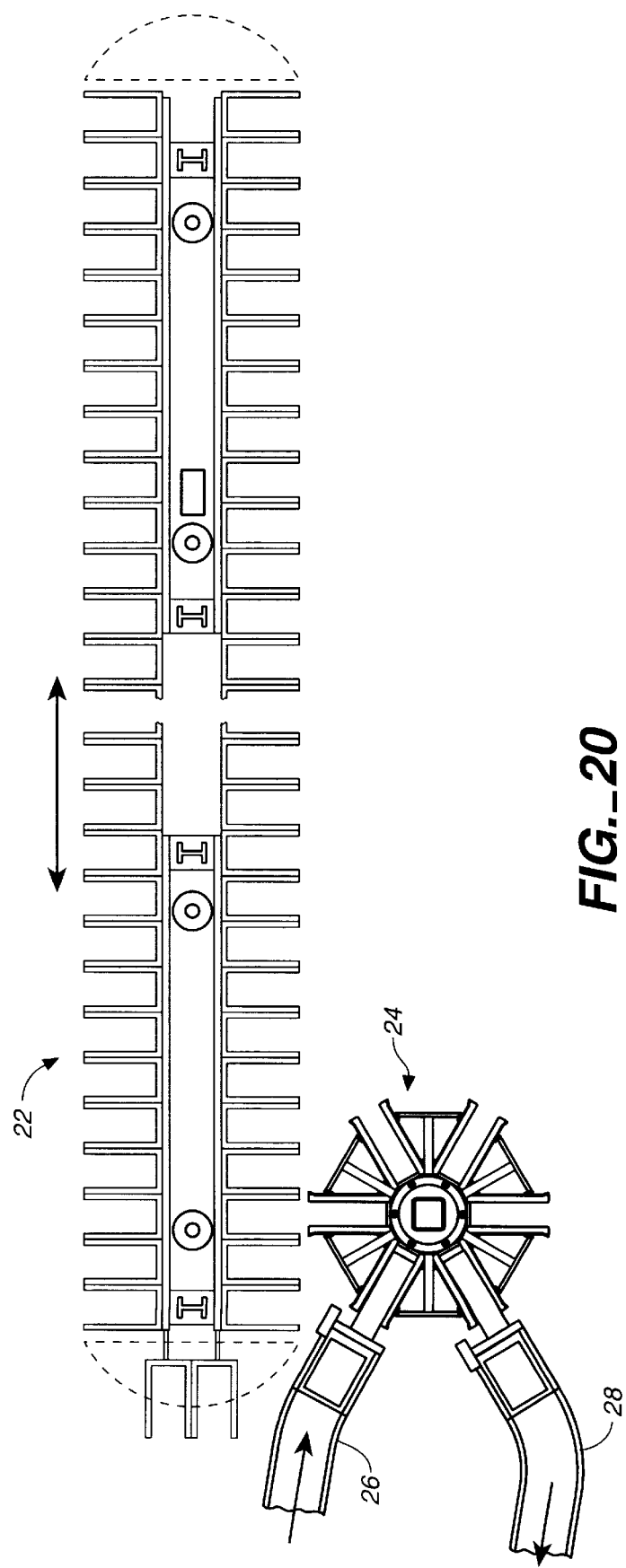
FIG._20

ROTATING ELEVATOR MECHANISM FOR ARTICLE TRANSFER IN AN AUTOMATED STORAGE SYSTEM

BACKGROUND

The present invention relates to automated distribution systems for storing and retrieving articles.

Many modern production and warehousing facilities require the storage and retrieval of thousands of inventoried goods. The goods may be stored in containers due to their size or delicate construction. Therefore, storage requires loading the containers and delivering them to a known location where subsequently they can be retrieved as necessary. When required, the desired items must be retrieved from their respective positions. An efficient storage operation includes the ability to store and retrieve a wide variety of goods and to dispose of the retrieved items rapidly and effectively. A wide variety of warehousing and distribution systems have been proposed to reduce the labor required in warehousing operations.

Certain storage and retrieval systems use large multi-level fixed storage shelves in combination with an extractor or picking mechanism that must travel to a particular shelf to pick a desired inventory item. For example, a mobile unit may traverse along a series of stationary vertical racks. The mobile unit is equipped with mechanisms for loading and unloading the vertically based storage racks. Such systems have several drawbacks. Initially, they are limited to a small number of insertion or extraction transactions each time the extractor is operated because the picking mechanism must be moved after each insertion or extraction operation. Additionally, such systems traditionally have fixed locations for storing each type of goods received within the warehouse. This prevents efficient space utilization since the fixed location occupies the same amount of space regardless of the number of stock units for a particular inventoried item. Therefore, such systems can waste valuable building space.

An improved automated storage and retrieval system having a storage carousel that can remain in continuous motion while containers are inserted onto or extracted from the carousel storage racks previously has been developed. That system is the subject of several U.S. patents, including U.S. Pat. Nos. 5,556,247; 5,282,712; 5,090,863; and 4,983, 091, which are assigned to the assignee of the subject application and are incorporated herein by reference.

There also is a need for a rapid storage or staging and retrieval system which readily can be adapted for efficient use with articles of varying or different sizes. This system should have a high transaction rate, which is the speed at which container insertion and extraction operations occur. It should also be capable of installation, for instance, in an existing warehousing facility with minimal impact on other facility resources, such as sources of electrical power and compressed air.

SUMMARY

In general, in one aspect, an apparatus for exchanging articles with an external article holder includes a vertical mast having a vertical mast axis. The apparatus includes a shuttle ring assembly having a central aperture surrounding the mast and coupled to the mast to allow the shuttle ring assembly to be translated vertically along the mast through multiple heights between a lower height and an upper height. The shuttle ring assembly includes a rotary member coupled to the mast to be rotated through multiple orientations about the mast axis. The rotary member includes multiple article-holding fixtures, angularly spaced from each other about the mast axis. The multiple orientations include a respective exchange orientation for each of the article-holding fixtures. The rotary member can be positioned in any one of the exchange orientations so that a selected one of the article-holding fixtures is in an associated exchange position. The shuttle ring assembly also includes an article transfer mechanism configured to transfer an article between the external article holder and the selected one of the article-holding fixtures when the rotary member is positioned so that the selected one of the article-holding fixtures is in its associated exchange position.

Various implementations include one or more of the following features. A first motor can raise and lower the shuttle ring assembly along the mast among multiple discrete heights and hold the shuttle ring assembly at any select one of the discrete heights. Each discrete height corresponds to a height at which the transfer element can transfer an article between a storage location of the external article holder and the selected article-holding fixture when the rotary member is positioned in the exchange orientation associated with the selected article-holding fixture. The shuttle ring assembly can be substantially without counterbalance. A second motor can rotate the rotary member between the exchange orientations and hold the rotary member in the exchange orientation associated with the selected article-holding fixture.

The transfer mechanism, which can be at a fixed angular orientation about the mast axis, can be configured to lift an article off an article-holding fixture in its exchange position, translate the article radially outward from the mast axis, and lower the article onto the article holder. The transfer mechanism also can be configured to lift an article off the article holder, translate the article radially inward toward the mast axis, and lower the article onto an article-holding fixture in its exchange position.

An article delivery system can be positioned to deliver articles to the rotary member. The multiple orientations can include a respective loading orientation for each of the article-holding fixtures. The rotary member can be positioned in any of the loading orientations so that a selected one of the article-holding fixtures is in an associated loading position adjacent the delivery system to receive an article from the delivery system.

An article pick-up system can be positioned to remove articles from the rotary member. The multiple orientations can include a respective unloading orientation for each of the article-holding fixtures. The rotary member can be positioned in any of the unloading orientations so that a selected one of the article-holding fixtures is in an associated unloading position adjacent the pick-up system to transfer an article to the article pick-up system.

In some implementations, the associated loading orientation of the rotary member for each article-holding fixture is the unloading orientation associated with another one of the fixtures.

In various implementations, each article-holding fixture of the rotary member includes left and right channel members having generally horizontal sections shaped to support respective portions of the underside of an article held by the fixture. The left and right channel members can have generally vertical sections shaped to prevent movement of the article relative to the fixture.

The apparatus also can include a carriage coupling the rotary member to the mast and a horizontal extension coupled to the carriage. The horizontal extension can have left and right lift carriages movable along respective front-to-back tracks. The transfer mechanism can include one or more blades projecting forward from the mast axis for supporting an article held by the transfer mechanism. In some implementations, the blades are substantially flat, while in other implementations, the blades are cradled.

The transfer mechanism also can include left and right longitudinal members extending rearward from the blades on respective sides of the mast and respectively coupled to the left and right lift carriages to permit reciprocal motion of the blades to insert and extract articles to and from the external article holder. A first pneumatic actuator can couple the carriage to the blades forward of the mast to lift the blades relative to the carriage. Left and right pneumatic actuators respectively can couple the left and right longitudinal members to the lift carriages to lift the longitudinal members relative to the carriage.

The carriage coupling the rotary member to the mast can include an upper and lower circular tracks engaged to the rotary member. In one implementation, the lower track has a male V-shaped bearing surface pointing radially outward from the mast axis, and the rotary member has multiple rollers engaging the bearing surface to locate the rotary member about the carriage.

The mast can have a hollow box section. The apparatus also can include a drive pulley partially within the mast and coupled to the first motor to be driven by the first motor. In some implementations, an idler pulley is located above the drive pulley, and a drive belt encircles the drive pulley, the idler pulley and a section of a wall of the mast therebetween. The drive belt is engaged to the drive pulley to be driven by the drive pulley, is engaged to the idler pulley to be supported by the idler pulley, and is secured to the shuttle ring assembly so that driving of the drive belt by the first motor moves the shuttle ring assembly vertically.

An article storage apparatus having multiple article-storage locations in multiple vertical positions can serve as the external article holder. The article storage apparatus can have at least one vertical array of article-storage locations arranged one above another. In some implementations, multiple vertical arrays of storage locations are coupled to each other in a closed loop chain movable along a track. The vertical arrays of storage locations can be arranged in pairs of adjacent storage locations, each of which is rigidly held on a rack movable along the track.

Each article-storage location can be configured to hold at least one article. In one implementation, each article storage location includes left and right channel members, each of which has a substantially flat portion for providing vertical support to an article held by the storage location. Each channel member can have a generally vertical portion for retaining an article. In some implementations, each storage location further includes a third channel member centered between the left and right channel members to provide additional support for the article. The third channel member can be shorter than the left and right channel members.

The apparatus can comprise a storage apparatus motor coupled to the chain of vertical arrays of storage locations to move the chain to bring a selected one of the vertical arrays into a position wherein articles in the storage locations of the selected array can be exchanged with the shuttle ring assembly. In various implementations, the storage apparatus motor is controllable to move the chain of vertical arrays of storage locations in either of two directions along the track.

The apparatus also can have an impact-absorbing element near the base of the mast to restrain downward movement of the shuttle ring assembly. In one implementation, the impact-absorbing element has a pair of gas-filled bladders and a bumper coupled to the bladders. The bumper is contacted by the shuttle ring assembly and transmits compressive force to the bladders.

In another aspect, a method of storing an article on a storage apparatus includes loading the article onto an article-holding fixture coupled to a shuttle ring assembly positioned about a vertical axis. The method further includes translating the shuttle ring assembly vertically along the axis to an exchange height and rotating the article-holding fixture about the axis to an exchange position. In addition, the article is transferred from the article-holding fixture to the storage apparatus when the article-holding fixture is in the exchange position at the exchange height.

In various implementations, the method includes one or more of the following steps. Various verification steps can be performed, such as verifying that the article-holding fixture is empty prior to loading the article onto the article-holding fixture and verifying that the article was loaded onto the article-holding fixture.

Transferring the article from the article-holding fixture can include lifting the article out of the article-holding fixture and positioning the article above a target storage location on the storage apparatus. The article can be lifted with a transfer mechanism having one or more blades for supporting the article as it is transferred to the storage apparatus. The transfer element can be driven to an extended position so that the article is positioned above a target storage location on the storage apparatus, and the transfer element can be lowered to allow the target storage location to acquire the article. The method can include confirming that the article has been transferred to the storage apparatus. The transfer element can be withdrawn to a retracted position.

The method also can include translating the shuttle ring assembly vertically along the axis to a loading height and rotating the article-holding fixture about the axis to a loading position prior to loading the article onto the article-holding fixture.

In some implementations, the method includes moving the storage apparatus along a track to position a storage location to receive the article from the holding fixture. The speed and direction of rotation of the storage apparatus can be established dynamically.

In yet a further aspect, a method of delivering an article from a storage apparatus to a pick-up system includes transferring the article from the storage apparatus to an article-holding fixture coupled to a shuttle ring assembly positioned about a vertical axis. The shuttle ring assembly is translated vertically along the axis to an unloading height, and the article-holding fixture is rotated about the axis to an unloading position. The article is unloaded from the article-holding fixture to the pick-up system when the article-holding fixture is in the unloading position at the unloading height.

In various implementations, the method of delivering the article includes one or more of the following features. Transferring the article from the storage apparatus can include lifting the article out of an article-storage location on the storage apparatus. The article can be lifted out of the article-storage location with a transfer mechanism having one or more blades for supporting the article as it is transferred to the article-holding fixture. The transfer element can be driven to an extended position so that the blades are positioned below the article on the article-storage location prior to lifting the article out of the article-storage location. The method can include withdrawing the transfer element to a retracted position so that the article is positioned above an article-holding fixture and lowering the transfer element to allow the article-holding fixture to acquire the article.

In some implementations, the shuttle ring assembly is translated vertically along the axis to an exchange height and the article-holding fixture is rotated about the axis to an exchange position prior to transferring the article from the storage apparatus.

In addition, the method can include moving the storage apparatus along a track to position the article adjacent a transfer unit to which the shuttle ring assembly is coupled. The speed and direction of rotation of the storage apparatus can be established dynamically.

In an additional aspect, an automated storage system includes a rotatable storage apparatus, a vertical transfer unit including a shuttle ring assembly, an article delivery system and an article pick-up system. A control system coupled to the rotatable storage apparatus, the vertical transfer unit, the delivery system and the pick-up system controls the operation thereof.

In one implementation, for example, the system has a first motor to raise and lower the shuttle ring assembly along the mast among multiple discrete heights and hold the shuttle ring assembly at any select one of the discrete heights. A second motor rotates the rotary member between the exchange orientations and holds the rotary member in the exchange orientation associated with the selected article-holding fixture. A third motor moves the article storage locations along the path to bring a selected one of the storage locations into a position wherein an article in a selected one of the storage locations can be exchanged with the shuttle ring assembly. A fourth motor drives the article transfer mechanism between an extended position and a retracted position. The various motors are controlled by the control system, which can include one or more amplifiers each of which is associated with at least one of the motors.

Various implementations include one or more of the following advantages. The system can provide rapid storage or staging and retrieval of articles and can be readily adapted for efficient use with articles of varying or different sizes. The system can provide a high transaction rate, which is the speed at which container insertion and extraction operations occur. The system also is capable of installation, for instance, in an existing warehousing facility with minimal impact on other facility resources.

Other features and advantages will be readily apparent from the following detailed description, drawings and claims.

BRIEF DESCRIPTION OF THE DRAWINGS

FIGS. 1A and 1B are diagrammatic top views of a storage system having a rotating storage apparatus and associated vertical transfer unit and delivery and pick-up systems.

FIG. 2 is a partial elevated side view of the rotating storage apparatus.

FIG. 3 is a diagrammatic side view of a rack of the rotating storage apparatus taken along line 3—3 in FIG. 2.

FIG. 4 is a tractor drive arrangement for driving the rotating storage apparatus rack.

FIGS. 5A and 5B are partial side views of the vertical transfer unit illustrating the insertion and extraction unit in retracted and extended positions, respectively.

FIGS. 6-7 are partial side views of the vertical transfer unit.

FIG. 8 is a top view of the vertical transfer unit taken along line 8—8 in FIG. 7.

FIG. 9 is a partial side view of a shuttle ring assembly attached to the vertical transfer unit.

FIG. 10 is a top view of the shuttle ring assembly taken along line 10—10 in FIG. 6.

FIG. 11 is a bottom view of the shuttle ring assembly taken along line 11—11 in FIG. 6.

FIGS. 12A–12D are side views of a transfer element for an insertion and extraction mechanism attached to the vertical transfer unit.

FIG. 13 is a top view of the transfer element of FIGS. 12A–12D.

FIG. 14 is a side view of a portion of the vertical transfer unit with the transfer element removed.

FIG. 15 is a side end view of the rotating storage apparatus and vertical transfer unit.

FIG. 16 is a top view of the vertical transfer unit taken along line 16—16 in FIG. 7.

FIGS. 17A-17B illustrate details of a brake mechanism associated with the vertical transfer unit.

FIG. 18 is a top view illustrating the transfer element of the insertion and extraction unit in an extended position.

FIG. 19 is a block diagram of a control system for the storage system.

FIG. 20 is a diagrammatic top view of another implementation of a storage system having a rotating storage apparatus and associated vertical transfer unit and delivery and pick-up systems.

DETAILED DESCRIPTION

As shown in FIGS. 1A-1B, a storage and retrieval system includes one or more multi-level rotating storage apparatus 22, each of which has an associated vertical transfer unit 24, together with a delivery system 26 and a pick-up system 28. A central control system 30 (FIG. 19) is coupled to the storage apparatus 22, the transfer unit 24, the delivery system 26 and the pick-up system 28 for controlling their respective operations. Generally, the control system 30 controls the operation of the system so that articles can be loaded from the delivery system 26 to the vertical transfer unit 24 for insertion onto the rotating storage apparatus 22. Stored articles subsequently can be extracted from the storage apparatus 22 by the transfer unit 24 and unloaded to be taken away by the pick-up system 28.

In the illustrated implementations, the system is configured for use with articles in the form of cartons or totes. Articles of various sizes and articles for holding different items can also be used. Thus, as used in this specification, the terms "article" and "articles" include cartons, boxes, totes and other containers for storing or holding items.

The Rotatinq Storage Apparatus

Each rotating storage apparatus 22 forms a horizontally traveling endless (closed loop) conveyor that carries multiple rack assemblies 32 (FIG. 2) about an obround path. As shown in FIGS. 2 and 3, each rack assembly 32 includes a rigid structure 34 to which vertical arrays of article storage locations 38A and 38B are secured. The arrays of storage locations are arranged in side-by-side relationship, and their respective storage locations 38A, 38B are arranged vertically, one above another as shown in FIG. 2. The rotating storage apparatus 22 includes upper and lower matching obround tracks along which the rack assemblies 32 are moved by a servomotor 42 (FIG. 4).

The rack structure 34, which can be made of steel, includes upper and lower lateral beam segments 44, 45 which form the top and bottom of the structure. Beam segments 44 (or 45) of adjacent structures 34 are attached to one another by connecting members 46. Each connecting member 46 is connected to two adjacent beam segments 44 (or 45) by pins 48 which allow the beam segments to pivot in the horizontal direction relative to the connecting member and relative to one another as the rack assemblies 32 move around the circular ends of the obround tracks. Each beam segment 44, 45 has one or more guide wheels 50 which engage the associated upper or lower tracks to guide the beam segment and, therefore, the rack assemblies 32 along the tracks. In addition, each beam segment 45 at the bottom of a rack structure includes a support wheel 52 which provides additional support for the associated rack assembly 32. As the chain of rack assemblies 32 rotate along the tracks, the beam segments 44, 45 and the corresponding connecting members 46 pivot with respect to one another.

Opposing lateral beam segments 44 and 45 at the top and bottom of the rack structure 34 can be connected by vertical support columns 54A–54C which form part of the support structure for the article storage locations 38A and 38B. The columns 54A–54C include multiple vertically-spaced mounting holes or slots 56 to receive and support the storage locations 38A, 38B. The holes 56 in the columns 54A–54C conveniently can be spaced apart to allow the spacing between the vertically-spaced storage locations 38A (or 38B) to be adjusted according to the requirements of the particular system. The article storage locations 38A, 38B can be mounted to the columns 54A–54C using bolts, lugs, pins, or screws, as well as other mounting techniques. The inward-facing side of each beam segment 44, 45 includes one or more elongated slots 58 or holes of another suitable shape. The slots 58 cooperate with and engage projections on timing belts to control the movement of the rack assemblies as explained below with respect to FIG. 4.

FIG. 4 illustrates the configuration of a driving arrangement for the rotating storage apparatus 22. Upper and lower endless toothed belts 60, 62 are positioned, respectively, around gears 64, 66 at upper and lower ends of a torque tube 68. The upper belt 60, which is located near the top of the rotating storage apparatus, is also positioned around a pulley 70. Similarly, the lower belt 62, which is located near the bottom of the rotating storage apparatus, is also positioned around a pulley 72. The servomotor 42 engages and drives the timing belts.

Each of the upper and lower belts has multiple projections 74, such as lugs or cogs, on its outer surface. The slots 58 in the lateral beam segments 44, 45 of the rack structure 34 are shaped to match the shape of the projections 74, and the distance between adjacent projections matches the distance between adjacent slots 58 in the beam segments. As the belts 60, 62 rotate around the gears of the torque tube 68 and around the pulleys, the projections 74 engage and are received by the slots 58, thereby causing the rack structure 34 of the rotating storage apparatus 22 to rotate along the upper and lower tracks in the same direction as the belts. The control system 30 can control the servomotor 42 to reverse the direction of travel and adjust the speed of the storage apparatus 22 about the tracks.

As shown in FIGS. 2 and 18, each of the article storage locations 38A and 38B includes respective left and right channel members 76A, 76B. The channel members 76A, 76B extend between proximal ends connected to the associated rack structure 34 and distal ends extending outwardly from the rotating storage apparatus. Each channel member 76A, 76B includes a first, generally flat vertical portion 78 for providing horizontal support to a container or other article held by the associated storage location and a second, generally flat vertical portion 80 for providing side-to-side retention of the container. Pairs of adjacent storage locations 38A, 38B can be formed as a single unit. In some implementations, another flat channel member 76C extends outward and is centered between the channel members 76A, 76B to provide additional support for an article resting on the article storage location 38A (or 38B). The central channel member 76C is shorter than the left and right channel members 76A, 76B so that the transfer of an article to or from the storage apparatus 22 can take place.

Each storage location 38A, 38B has a vertical longitudinal center plane. The rack structures 34 and beam segments 44, 45 have dimensions such that there is a constant horizontal pitch between vertical arrays of storage locations 38A, 38B along a straight portion of the tracks. In other words, the horizontal spacing between the center planes of adjacent storage locations 38A, 38B is substantially constant. Such an arrangement allows the servomotor 42 to bring any given vertical array of storage locations 38A or 38B to an exchange location adjacent the vertical transfer unit 24.

Additional details of the rotating storage apparatus 22 also are described in co-pending U.S. Ser. No. 08/796,274, filed on Feb. 7, 1997 and entitled "Staging, Tracking and Retrieval System With a Rotatable Storage Structure." That application, which is assigned to the assignee of the present invention, is incorporated herein by reference in its entirety.

Vertical Transfer Unit

Referring to FIGS. 5–8, the vertical transfer unit 24 includes a vertical mast 98 having a mast axis 100. At its base, the mast 98 is secured to the factory or warehouse floor. At its top 101, the mast 98 may be cross-braced to the rotating storage apparatus 22 or otherwise held firmly in place. The vertical transfer unit 24 further includes a shuttle ring assembly 102 having a central aperture 224 (FIG. 8) surrounding the mast 98. As illustrated in FIG. 15 and as described in further detail below, the shuttle ring assembly 102 is coupled to the mast 98 to be vertically translated along the mast in a range between a lower height and an upper height. The shuttle ring assembly 102 includes a carriage 104 and a rotary member 106. The carriage 104 is secured to the mast for linear translation along the mast driven by a servomotor 108 and can be driven substantially without counterbalance.

The servomotor 108 can raise and lower the shuttle ring assembly 102 in a range between the upper height and the lower height. The range of the shuttle ring assembly 102 includes multiple heights at which the shuttle ring assembly can insert or extract an article to or from a storage location 38A, 38B on the rotating storage apparatus 22. The range of vertical movement also includes a loading height and an unloading height where the shuttle ring assembly can load an article from the delivery system 26 and unload an article to the pick-up system 28, respectively. In one implementation, the loading and unloading heights are coincident with each other. The loading and loading heights also can be coincident with the height of the lowermost storage locations 38A, 38B on the storage apparatus. In other implementations, the loading height can be different from the unloading height.

Referring to FIGS. 7-8, the mast 98 has a generally square hollow box cross-section defined by left, right, front, and back walls 200A–200D. Near the base of the mast 99, the servomotor 108 is mounted on the outer surface of the left wall 200B. The servomotor 108 has a shaft 202 extending through the wall and into the interior of the mast 98. A toothed drive pulley 204 is secured to the shaft 202 (see also FIG. 6). The drive pulley 204 is positioned partially within the mast, with its periphery protruding slightly through an aperture in the front wall 200C. A toothed idler pulley 206 of similar size and shape to the drive pulley 204 is located proximate the top of the mast 98, directly above the drive pulley. The idler pulley 206 is carried by a shaft 208 having left and right ends respectively held by right and left bearings 210A, 210B in apertures in the left and right walls of the mast. The idler pulley 206 extends partially through an aperture in the front wall. A toothed drive belt 212 encircles the drive pulley 204, the idler pulley 206 and a section of the front wall between the pulleys. Intermeshing teeth engage the belt 212 with the drive pulley 204 and the idler pulley 206 so that the belt is driven by the drive pulley and supported by the idler pulley. The belt 212 rotates the idler pulley 206 in response to being driven by the drive pulley 204.

Along the outside surfaces of the walls 200A and 200B of the mast 98 are pairs of front and rear tracks 218, 220 having respective forward and rearward-facing male V-shaped bearing surfaces 226. To engage the bearing surfaces, the carriage 104 bears rollers 222 having female V-shaped surfaces in rolling engagement with associated bearing surfaces 226. In particular, the rollers 222 are arranged in four pairs of rollers on trucks associated with corresponding tracks 218, 220.

The drive belt 212 is secured to the carriage 104, for example, by clamps immediately in front of the front wall 200C of the mast 98. Accordingly, driving the belt 212 with the servomotor 108 moves the carriage 104 and, thus, the shuttle ring assembly 102, in the vertical direction. The shuttle ring assembly 102 can be supported vertically by the drive belt 212, and, thus, by the servomotor 108, without counterweight.

At the base 99 of the mast 98, a stop or brake mechanism 300 (FIG. 6) prevents downward movement of the shuttle ring assembly beyond its lower height. Referring to FIGS. 16 and 17A-B, the brake mechanism 300 includes a pair of elastomeric bladders, or air springs, 302 coupled to a generally horizontal bumper plate 304 at least partially encircling the mast 98. When the carriage 104 reaches its lower height, it contacts the bumper plate 304 causing compression of the bladders which have been pre-pressurized with an appropriate fluid such as air. To support the bumper plate 304 and transfer any impact force to the bladders 302, a mechanism 306 is associated with each bladder. The bladders 302 and their respective mechanisms 306 are positioned diametrically opposite each other about the mast axis 100. Each mechanism 306 has an approximately triangular rigid frame element 308 which is pivotally coupled to the bumper plate 304 (see, for example, pivot point 324 in FIG. 16). Each bladder 302 is held within an associated fixture 312 and is compressible between a fixed outboard plate 314 of the fixture and a movable inboard plate 316 which is mounted to the fixture for linear movement parallel to a central axis 318 of the associated bladder.

Along the axis 318, the inboard plate 316 is pivotally coupled to an outboard end of a force transfer link 320 (see, for example, pivot point 326 in FIG. 17A). At its inboard end, the force transfer link 320 is pivotally coupled to the frame element 308. FIG. 17A shows one of the bladders 302 in a relaxed, substantially uncompressed, condition. If the shuttle ring assembly 102 collides with the bumper plate 304, the downward force transferred to the bumper plate is transferred to each mechanism 306, and the inboard plate 316 moves along the axis 318 to compress the bladder 302 (FIG. 17B). As the impact of the shuttle ring assembly against the bumper plate 304 drives the bumper plate further downward, the increasing compression of the bladders 302 produces an increasing responsive upward force applied by the bumper plate to the shuttle ring assembly to absorb the impact of the shuttle ring assembly and restrain further downward movement even under power from the drive motor. Each mechanism 306 is supported below by a respective elastomeric pad 322. Compression of the pads 322 of the oppositely positioned mechanisms 306 maintain the bumper plate 304 centered about the mast axis 100.

Referring to FIGS. 6 and 9–11, the rotary member 106 of the shuttle ring assembly 102 is mounted on the carriage 104 for relative rotation about the mast axis 100 driven by a servomotor 110. The rotary member 106 includes multiple holding fixtures 112A-112F (collectively and individually 112) each of which can hold an article. The rotary member 106 can rotate to position a fixture 112 opposite the rotating storage apparatus 22, the delivery system 26 or the pick-up system 28. Thus, the rotary member 106 can be rotated about the mast axis 100 so that a given article holding fixture 112 is placed in a respective exchange, loading or unloading orientation.

In the illustrated implementation, there are six identical co-planar fixtures 112 angularly spaced about the mast axis 100 evenly. Each fixture 112 is formed as a fork having left and right tines formed by left and right channel members 114A and 114B, respectively. Slightly recessed from their distal ends, each left channel member 114A is structurally connected to the adjacent right channel member 114B of the adjacent fixture by a distal cross member or brace 126. Each of the channel members 114A, 114B has a generally horizontal portion 116A, 116B shaped and positioned to support respective left and right portions of the underside of an article held by the fixture. Each channel member 114A, 114B further includes a generally vertical portion 118A, 118B extending upward from the associated horizontal portion 116A, 116B and shaped with dimensions to prevent relative respective leftward and rightward movement of an article held by the fixture. At its distal end (e.g., radially outward from the mast axis 100) each vertical portion 118A, 118B may be flared laterally outward to provide a guiding feature to guide an article into the fixture from the delivery system 26 or from the storage apparatus 22.

The rotary member 106 further includes a unitary base flange 122 (FIGS. 9 and 11) to which the channel members 114A and 114B of each fixture 112 are secured at their respective proximal ends. The flange 122 has a central aperture 238 to accommodate the mast 98. On its lower surface or underside, the flange 122 bears an annular toothed wheel or gear 124. The flange 122 carries multiple rollers 236B on its lower surface.

The rotary member 106 also includes an annular upper flange 128 above the base flange 122 and coaxially centered about the mast axis 100. The upper flange 128 is connected to the base flange 122 by a group of vertical columns 130. Each column 130 is connected to the flange 122 proximate a convergence of left and right channel members of each pair of adjacent fixtures 112. A diagonal brace 132 is associated with each column 130. The diagonal brace 132 is connected at its upper end to the flange 128 proximate the upper end of the associated column 130 and, at its lower end, is connected centrally to an associated cross member 126. On its upper surface, the upper flange 128 bears six rollers 236A described in further detail below.

The carriage includes a pair of upper and lower circular tracks 230A, 230B (FIGS. 7-8) for mounting the rotary member 106 on the carriage 104. Each track 230A, 230B has a male V-shaped bearing surface pointing radially outward from the mast axis 100. The carriage 104 has four walls 232A–232D, each slightly outboard of an associated wall 200A–200D of the mast 98. The upper and lower tracks 230A, 230B are formed on flanges 234A, 234B (FIG. 7) at the upper and lower end of the carriage walls, respectively, extending outward from the carriage walls. The rotary member 106 has upper and lower rings, respectively, defined by the upper flange 128 and base flange 122 (FIG. 9) and generally proximate the upper and lower tracks 230A, 230B of the carriage 104. The upper and lower rings have associated groups of rollers 236A, 236B (FIGS. 10 and 11), each roller having a female V-shaped surface in rolling engagement with the associated track. Each ring has six rollers which may be adjusted to maintain firm engagement with the associated track (230A or 230B) to locate the rotary member 106 about the carriage 104. A toothed belt 240 engages the gear 124 of the rotary member 106 and through a transmission 242 is engaged to the servomotor 110 (see FIGS. 6 and 9). As seen in FIG. 6, the transmission and servomotor 110 are mounted on a rearwardly-projecting extension 244 from the carriage 104 below the belt 240.

Various portions of the shuttle ring assembly 102 are formed from steel. Weight lightening holes can be provided in some of the components to minimize the mass and reduce the energy consumption.

Transfer Mechanism Referring to FIGS. 5A-5B, 12A–12D, 13 and 18, the vertical transfer unit 24 has an insertion and extraction mechanism, or transfer mechanism, 400 which is configured to transfer articles one at a time between a fixture 112 on the rotary member 106 and a storage location 38A, 38B on the rotating storage apparatus 22. The insertion and extraction mechanism 400 is positioned at a fixed angular orientation about the mast axis 100. The insertion and extraction mechanism 400, includes a transfer element 402 having a pair of left and right blades 404A and 404B projecting generally forward from the mast axis 100 toward the rotating storage apparatus 22. The blades 404A, 404B can be flat or slightly cradled to facilitate the transfer of an article between one of the fixtures 112 and a storage location 38A, 38B on the rotating storage apparatus 22. At proximal (rear) ends, the blades 404A, 404B are coupled to a transverse root member 406 from which two inwardly-facing longitudinal C-sectioned channel members 408A and 408B extend rearward adjacent opposite sides of the mast.

Along left and right sides of the extension 244 are pairs of upper and lower front-to-back tracks 410, 412 (FIG. 14) having respective upward and downward-facing male V-shaped bearing surfaces. A respective lift carriage 414 is associated with each pair of tracks 410, 412. To engage the bearing surfaces, each lift carriage 414 has a pair of upper rollers 416 for engaging the associated upper track 410 and a pair of lower rollers 418 for engaging the associated lower track 412. The rollers 416, 418 have female V-shaped surfaces for engaging the associated bearing surfaces. Each lift carriage 414 has a lift mechanism, or actuator, 420 coupled to the rear end of the associated channel member 408A, 408B (FIGS. 5A and 5B). Each lift mechanism 420 is actuated by a respective pneumatic cylinder 422 (FIG. 14) to raise and lower the rear end of the associated channel member 408A, 408B.

A forward lift mechanism or actuator 424 (FIGS. 5A-5B and 6) is provided along the front of the carriage 104, diametrically opposite the extension 244. At each side of the forward lift mechanism 424, a pair of rollers 436 (FIGS. 5B and 12A) can be secured. The rollers 436 have female V-shaped surfaces which can engage upper and lower tracks 438A, 438B defined by downward and upward-facing male V-shaped bearing surfaces formed along respective upper and lower edges of the opening of the associated C-shaped channel member 408A, 408B. The rollers 436 support the channel members 408A or 408B by engaging the upper tracks 438A. The lower tracks 438B retain the side-to-side movement of the rollers 436. By activating the lift mechanisms 420, 424, the transfer element 402 can be raised and lowered relative to the carriage 104 (FIG. 12B). Differential activation of the rear lift mechanisms 420 on the one hand and the forward lift mechanism 424 on the other hand provides the capability of pitching the transfer element 402 up or down (FIGS. 12C-12D).

A servomotor 426 is configured to drive the transfer element 402 between an extended or forward position (FIGS. 18 and 5B) and a retracted or rearward position (FIG. 5A). The servomotor 426 is located along the underside of the extension 244 at the proximal end of the extension. The servomotor 426 is coupled by a transmission 428 (FIG. 14) to a right toothed drive belt 430 extending rearward along the right side of the extension. At the distal end of the extension 244, adjacent its underside, the extension rotatably carries a transverse shaft 435. Right and left toothed pulleys 432 are secured to the ends of the shaft 435. The drive belt 430 encircles the pulley 432 and is engaged thereto via intermeshing teeth. The drive belt 430 extends forward along the right side of the extension 244 and encircles an idler pulley 434 rotatably mounted at the proximal end of the extension. Another drive belt (not shown) encircles the left toothed pulley and a left idler pulley and is slaved to the right belt 430. The drive belts 430 can be secured to the respective lift carriages 414 by clamps or other means. Rotation of the drive belts 430 induced by the servomotor 426 produces a translation of the lift carriages 414 and, therefore, the transfer element 402.

Delivery and Pick-up Systems

The delivery and pick-up systems 26, 28 are formed as queuing conveyors 440, 442 with respective transfer units 444, 446 located near the vertical transfer unit 24 (FIGS. 1A-1B). The conveyors 440, 442 can be of the non-contact or zero pressure accumulating type. The transfer unit 444 is an actuated device that can receive an article from the conveyor 440 and insert it in one of the holding fixtures 112 on the shuttle ring assembly 102. Similarly, the transfer unit 446 is an actuated device that can lift an article from one of the holding fixtures and transfer it to the conveyor 442. In this manner, the transfer unit 444 adjacent the delivery conveyor 440 provides a loading position. Similarly, the transfer unit 446 adjacent the pick-up conveyor 442 provides an unloading position. As noted above, for each article holding fixture 112 on the shuttle ring assembly 102, there are respective loading and unloading orientations of the rotary member 106 associated with the loading and unloading positions of the fixture.

In the illustrated implementation, the systems 26, 28 are at the same height. However, they can be located at different heights adjacent the vertical transfer unit 24. Moreover, multiple delivery and pick-up systems 26, 28 can be stacked one above the other to provide multiple loading and unloading positions at different heights.

Control System

As indicated above, the central control system 30 (FIG. 19) is coupled to the storage apparatus 22, the transfer unit 24, the delivery system 26 and the pick-up system 28 for controlling their respective operations.

The control system 30 includes a central processing unit (CPU) 450 and a combined motion and input/output (I/O) device controller 452. In one implementation, the controller 452 includes a control card which is mounted in the CPU 450. The controller also includes one or more amplifiers. Each amplifier is coupled to a respective one of the servomotors 42, 108, 110 and 426 for controlling the motion of the rotating storage apparatus 22, the carriage 104, the rotary member 110, and the insertion and extraction mechanism 400. The control card is programmable to permit control of the servomotors as well as other devices, such as the actuators 420, 424 for controlling the raising and lowering of the transfer mechanism 402.

The control card also receives signals from input devices, such as sensors indicating the position of an article or the identification of an article. Such sensors can be located at various positions in the storage and retrieval system to facilitate efficient operation of the system and to track the articles as they are loaded and unloaded, or transferred to and from different parts of the system. In one implementation, bar codes can be placed on each article, and bar code readers can be used as the identification sensors. Photoelectric sensors, for example, can be used as position detectors.

The CPU 450 is coupled to a customer's host computer 454. The host computer 454 and the CPU 450 can communicate, for example, over a link using a TCP/IP protocol. Software residing in the CPU processes requests received from the host computer 454. The CPU 450 also includes software for performing administrative functions, such as managing a display screen, executing maintenance routines, logging transactions occurring in the storage and retrieval system, and generating reports about the location and content of articles stored in the system. In addition, the CPU 450 includes software for determining which task has priority when multiple tasks must be performed.

Delivery and Storage Procedure

An article, such as a container, can be received from a customer's process conveyor if there is an open queue on the delivery conveyor 26. The control system 30 positions the shuttle ring assembly 102 and rotary member 106 at a delivery height, with the rotary member in a loading orientation for a given article holding fixture 112. The control system 30 verifies that the intended holding fixture 112 is empty and activates the transfer unit 444 to load the container onto the fixture. A bar code reader can scan the container for identification, and other sensors can verify delivery and loading of the container to the fixture 112 by checking the empty queue and the fixture.

When delivered, the container is supported by the fixture, with the channel members 114A, 114B supporting the bottom of the container along its sides. To help maintain light items, such as letters or other small parcels, within an open container, a cover can be provided for the container. The shuttle ring assembly 102 is raised to an exchange height associated with a target storage location, such as the storage location 38A, and the rotary member 106 is rotated to the exchange orientation associated with the fixture 112 holding the container. A position-sensor can provide the angular position of the rotary member 106 to the computer 30.

At some point during the process, the storage apparatus 22 can be driven to place the target storage location 38A in the exchange position in front of the transfer unit 24. The control system 30 dynamically establishes the speed and direction of rotation to achieve maximum throughput. Sensors can validate the position of the storage apparatus 22 to the computer 30.

Once movement of the storage apparatus 22 and the shuttle ring assembly is stopped, the container can be transferred from the fixture 112 to the target storage location 38A. To affect the transfer, the transfer element 402 of the insertion and extraction mechanism 400 is raised to its elevated height, with the blades 404A, 404B passing upwardly between the channel members 114A, 114B to engage the underside of the container and lift the container out of engagement with the fixture 112. The transfer element 402 then is driven from its retracted position to its extended position so that the container passes forward of the fixture 112 to a position immediately above the target storage location 38A. The transfer element 402 is brought back to its lowered height, the blades 404A, 404B passing between the left and right channel members 76A, 76B of the target storage location 38A (see FIG. 18), allowing the storage location to acquire the container from the transfer element. Sensors can confirm that the container has been transferred by checking the empty holding fixture 112. Bar code sensors can be used to update a database associated with the control system 30 with the contents of the article storage locations 38A, 38B on the storage apparatus 22. The transfer element 402 then is withdrawn to its retracted position, whereupon the shuttle ring assembly 102 and rotary member 106 can be moved and rotated, respectively, as may be required. Similarly, the rotating storage apparatus 22 can be rotated to place another vertical array of article storage locations 38A (or 38B) in the exchange position.

Retrieval and Pick-up Procedure

Articles stored on the rotating storage apparatus 22 can be retrieved. Retrieval is achieved generally as a reverse procedure of storage. A target container is held in a target storage location, for example a storage location 38A, attached to the rotating storage apparatus 22. The rotating storage apparatus 22 can be driven to place the storage location 38A in the exchange position in front of the transfer unit 24. Similarly, a target holding fixture 112 on the rotary member 106 is placed in the appropriate exchange height and position to receive the target container.

At this point, the transfer element 402 of the insertion and extraction mechanism 400 is in its retracted position and lowered height with the blades 404A, 404B below the target holding fixture 112. The transfer element 402 is translated to its extended position so that the blades 404A, 404B are immediately below the container on the storage location 38A. The transfer element 402 then is raised to its elevated height, with the blades 404A, 404B passing upward between the channel members 76A, 76B of the storage location 38A so as to engage the underside of the container and lift the container out of engagement with the storage location. The transfer element 402 is driven from its extended position to its retracted position, with the container passing from slightly above the storage location 38A to immediately above the target holding fixture 112. The transfer element 402 then is lowered back to its lowered height, with the blades 404A, 404B passing between the channel members 114A and 114B of the target fixture 112, thereby allowing the target fixture to acquire the container from the transfer element.

The shuttle ring assembly 102 then can be moved vertically and rotated, for example, so that the target fixture 112 is located at the unloading height and unloading position adjacent the pick-up transfer unit 446 of the pick-up system 28. The transfer unit 446 then removes the container from the fixture 112 and transfers the container to the pick-up conveyor 442.

For the purpose of clarity, the delivery and pick-up processes have been described above with respect to the delivery and storage, as well as the retrieval and pick-up, of a single article at a time. However, in the illustrated implementation, up to six articles can be delivered from the delivery system 26 and loaded onto respective holding fixtures 112A–112F for subsequent insertion onto the rotating storage apparatus 22. Similarly, up to six articles can be extracted from respective storage locations 38A, 38B on the storage apparatus 22 for subsequent unloading to the pick-up system 28.

The system illustrated in FIGS. 1A-1B includes a single rotating storage apparatus 22 with a single vertical transfer unit 24 associated with it. The delivery system 26 and pick-up system 28 are positioned at an angular separation of 180 degrees. FIG. 20 illustrates another implementation in which the delivery system 26 and pick-up system 28 are separated by 60 degrees. This permits an article to be unloaded from a particular holding fixture 112 and another article to be loaded onto the same fixture quickly and efficiently.

In other implementations, a single rotating storage apparatus can have two vertical transfer units associated with it. In such an implementation, each of the transfer units has respective adjacent delivery and pick-up systems.

While, various details and configurations are set forth in the foregoing description, other implementations are within the scope of the following claims.

What is claimed is:

1. An apparatus for exchanging articles with an external article holder, the apparatus comprising:
   a vertical mast having a vertical mast axis; and
   a shuttle ring assembly having a central aperture surrounding the mast and coupled to the mast to allow the shuttle ring assembly to be translated vertically along the mast through a plurality of heights between a lower height and an upper height, the shuttle ring assembly including:
      a rotary member coupled to the mast to be rotated through a plurality of orientations about the mast axis and comprising a plurality of article-holding fixtures, angularly spaced from each other about the mast axis, wherein the plurality of orientations includes a respective exchange orientation for each of the article-holding fixtures, and wherein the rotary member can be positioned in any one of the exchange orientations so that a selected one of the article-holding fixtures is in an associated exchange position; and
      an article transfer mechanism configured to transfer an article between the external article holder and the selected one of the article-holding fixtures when the rotary member is positioned so that the selected one of the article-holding fixtures is in its associated exchange position.

2. The apparatus of claim 1 further comprising:
   a first motor to raise and lower the shuttle ring assembly along the mast among a plurality of discrete heights and hold the shuttle ring assembly at any select one of the discrete heights, each discrete height corresponding to a height at which the transfer element can transfer an article between a storage location of the external article holder and the selected article-holding fixture when the rotary member is positioned in the exchange orientation associated with the selected article-holding fixture; and
   a second motor to rotate the rotary member between the exchange orientations and to hold the rotary member in the exchange orientation associated with the selected article-holding fixture.

3. The apparatus of claim 1 wherein the transfer mechanism is at a fixed angular orientation about the mast axis.

4. The apparatus of claim 3 wherein the transfer mechanism is configured to lift an article off an article-holding fixture in its exchange position, translate the article radially outward from the mast axis, and lower the article onto the article holder.

5. The apparatus of claim 4 wherein the transfer mechanism is configured to lift an article off the article holder, translate the article radially inward toward the mast axis, and lower the article onto an article-holding fixture in its exchange position.

6. The apparatus of claim 1 further comprising an article delivery system positioned to deliver articles to the rotary member, wherein the plurality of orientations includes a respective loading orientation for each of the article-holding fixtures, and wherein the rotary member can be positioned in any of the loading orientations so that a selected one of the article-holding fixtures is in an associated loading position adjacent the delivery system to receive an article from the delivery system.

7. The apparatus of claim 6 further comprising an article pick-up system positioned to remove articles from the rotary member, wherein the plurality of orientations includes a respective unloading orientation for each of the article-holding fixtures, and wherein the rotary member can be positioned in any of the unloading orientations so that a selected one of the article-holding fixtures is in an associated unloading position adjacent the pick-up system to transfer an article to the article pick-up system.

8. The apparatus of claim 7 wherein for each article-holding fixture, the associated loading orientation of the rotary member is the unloading orientation associated with another one of the fixtures.

9. The apparatus of claim 1 further comprising a drive motor to drive the shuttle ring assembly vertically along the mast axis, wherein the shuttle ring assembly is substantially without counterbalance.

10. The apparatus of claim 1 wherein each article-holding fixture of the rotary member comprises:
   a left channel member having a generally horizontal section shaped to support a portion of an underside of an article held by such fixture; and
   a right channel member extending generally parallel to the left channel member and having a generally horizontal section shaped to support another portion of the underside of the article held by such fixture.

11. The apparatus of claim 10 wherein the left and right channel members each having a generally vertical section shaped to prevent movement of the article relative to the fixture.

12. The apparatus of claim 11 further comprising:
   a carriage coupling the rotary member to the mast;
   a horizontal extension coupled to the carriage and having left and right lift carriages movable along respective front-to-back tracks, wherein the transfer mechanism is at a fixed angular orientation about the mast axis, and wherein the transfer mechanism includes:
      at least one blade projecting forward from the mast axis for supporting an article held by the transfer mechanism; and
      left and right longitudinal members extending rearward from the at least one blade on respective sides of the mast and respectively coupled to the left and right lift carriages to permit reciprocal motion of the at least one blade to insert and extract articles to and from the external article holder.

13. The apparatus of claim 12 further comprising:
a first pneumatic actuator coupling the carriage to the at least one blade forward of the mast to lift the at least one blade relative to the carriage;
left and right pneumatic actuators respectively coupling the left and right longitudinal members to the lift carriages to lift the left and right longitudinal members relative to the carriage.

14. The apparatus of claim 11 further comprising a carriage coupling the rotary member to the mast, wherein the carriage comprises an upper circular track engaged to the rotary member and a lower circular track engaged to the rotary member, the lower track having a male V-shaped bearing surface pointing radially outward from the mast axis, and the rotary member having a plurality of rollers engaging the bearing surface to locate the rotary member about the carriage.

15. The apparatus of claim 2 wherein the mast has a hollow box section and wherein the apparatus further comprises:
a drive pulley partially within the mast and coupled to the first motor to be driven by the first motor;
an idler pulley above the drive pulley; and
a drive belt encircling the drive pulley, the idler pulley and a section of a wall of the mast therebetween;
wherein the drive belt is engaged to the drive pulley to be driven by the drive pulley, is engaged to the idler pulley to be supported by the idler pulley, and is secured to the shuttle ring assembly so that driving of the drive belt by the first motor vertically moves the shuttle ring assembly.

16. The apparatus of claim 1 further comprising:
an article storage apparatus having a plurality of article-storage locations located in a plurality of vertical positions, wherein the article-storage locations serve as the external article holder.

17. The apparatus of claim 1 further comprising:
an article storage apparatus having at least one vertical array of article-storage locations, the article-storage locations serving as the external article holder and arranged one above another, each article-storage location configured to hold at least one article and comprising left and right channel members, wherein each channel member has a substantially flat portion for providing vertical support to an article held by the storage location.

18. The apparatus of claim 17 wherein each channel member has a generally vertical portion for side-to-side retaining of an article.

19. The apparatus of claim 17 wherein each storage location further comprises a third channel member centered between the left and right channel members to provide additional support for the article.

20. The apparatus of claim 19 wherein the third channel member is shorter than the left and right channel members.

21. The apparatus of claim 17 comprising a plurality of such vertical arrays of storage locations coupled to each other in a closed loop chain movable along a track.

22. The apparatus of claim 21 wherein the vertical arrays of storage locations are arranged in pairs of adjacent storage locations, each pair of adjacent storage locations rigidly held on a rack movable along the track.

23. The apparatus of claim 17 comprising a storage apparatus motor coupled to the chain of vertical arrays of storage locations to move the chain to bring a selected one of the vertical arrays into a position wherein articles in the storage locations of the selected array can be exchanged with the shuttle ring assembly.

24. The apparatus of claim 23 wherein the storage apparatus motor is controllable to move the chain of vertical arrays of storage locations in either of two directions along the track.

25. The apparatus of claim 1 further comprising:
an impact-absorbing element proximate a base of the mast to restrain downward movement of the shuttle ring assembly, the impact-absorbing element comprising a pair of gas-filled bladders and a bumper coupled to the bladders to be contacted by the shuttle ring assembly and transmit compressive force to the bladders.

26. The apparatus of claim 1 further comprising:
a carriage coupling the rotary member to the mast;
a horizontal extension coupled to the carriage and having left and right lift carriages movable along respective front-to-back tracks, wherein the transfer mechanism is at a fixed angular orientation about the mast axis, and wherein the transfer mechanism includes:
at least one blade projecting forward from the mast axis for supporting an article held by the transfer mechanism; and
left and right longitudinal members extending rearward from the at least one blade on respective sides of the mast and respectively coupled to the left and right lift carriages to permit reciprocal motion of the at least one blade to insert and extract articles to and from the external article holder.

27. The apparatus of claim 26 wherein the at least one blade is substantially flat.

28. The apparatus of claim 26 wherein the at least one blade is cradled.

29. The apparatus of claim 26 further comprising:
a first pneumatic actuator coupling the carriage to the at least one blade forward of the mast to lift the blade relative to the carriage;
left and right pneumatic actuators respectively coupling the left and right longitudinal members to the lift carriages to lift the left and right longitudinal members relative to the carriage.

30. An automated storage system comprising:
(A) an article storage apparatus rotatable along an obround path and having a plurality of article-storage locations located in a plurality of vertical positions;
(B) a vertical transfer unit disposed adjacent the article storage apparatus, the vertical transfer unit including:
(1) a vertical mast having a vertical mast axis; and
(2) a shuttle ring assembly having a central aperture surrounding the mast and coupled to the mast to allow the shuttle ring assembly to be translated vertically along the mast through a plurality of heights between a lower height and an upper height, the shuttle ring assembly including:
(a) a rotary member coupled to the mast to be rotated through a plurality of orientations about the mast axis and comprising a plurality of article-holding fixtures, angularly spaced from each other about the mast axis, wherein the plurality of orientations includes a respective exchange orientation for each of the article-holding fixtures, and wherein the rotary member can be positioned in any one of the exchange orientations so that a selected one of the article-holding fixtures is in an associated exchange position; and
(b) an article transfer mechanism configured to transfer an article between the rotatable storage apparatus and the selected one of the article-holding fixtures when the rotary member is positioned so that the selected one of the article-holding fixtures is in its associated exchange position;

(C) an article delivery system positioned to deliver articles to the rotary member, wherein the plurality of orientations includes a respective loading orientation for each of the article-holding fixtures, and wherein the rotary member can be positioned in any of the loading orientations so that a selected one of the article-holding fixtures is in an associated loading position adjacent the delivery system to receive an article from the delivery system;

(D) an article pick-up system positioned to remove articles from the rotary member, wherein the plurality of orientations includes a respective unloading orientation for each of the article-holding fixtures, and wherein the rotary member can be positioned in any of the unloading orientations so that a selected one of the article-holding fixtures is in an associated unloading position adjacent the pick-up system to transfer an article to the article pick-up system; and (E) a control system coupled to the rotatable storage apparatus, the vertical transfer unit, the delivery system and the pick-up system for controlling operation thereof.

31. The automated storage system of claim 30 further comprising:

a first motor to raise and lower the shuttle ring assembly along the mast among a plurality of discrete heights and hold the shuttle ring assembly at any select one of the discrete heights;

a second motor to rotate the rotary member between the exchange orientations and to hold the rotary member in the exchange orientation associated with the selected article-holding fixture;

a third motor to move the article storage locations along the path to bring a selected one of the storage locations into a position wherein an article in a selected one of the storage locations can be exchanged with the shuttle ring assembly; and a fourth motor to drive the article transfer mechanism between an extended position and a retracted position;

wherein the motors are controlled by the control system.

32. The automated storage system of claim 30 wherein the control system comprises one or more amplifiers each of which is associated with at least one of the motors.

33. An automated apparatus for exchanging an article with an article holder, the automated apparatus comprising:

a vertical mast having a vertical mast axis; and a shuttle ring assembly having a central aperture surrounding the mast and coupled to the mast to allow the shuttle ring assembly to be translated vertically along the mast through a plurality of heights between a lower height and an upper height, the shuttle ring assembly including:

a rotary member coupled to the mast to be rotated through a plurality of orientations about the mast axis and comprising a plurality of article-holding fixtures, angularly spaced from each other about the mast axis, wherein the plurality of orientations includes a respective exchange orientation for each of the article-holding fixtures, and wherein the rotary member can be positioned in any one of the exchange orientations so that a selected one of the article-holding fixtures is in an associated exchange position; and an article transfer mechanism positioned at a fixed angular orientation about the mast axis and configured to transfer an article between the external article holder and the selected one of the article-holding fixtures when the rotary member is positioned so that the selected one of the article-holding fixtures is in its associated exchange position; wherein the transfer mechanism is further configured to lift an article off an article-holding fixture in its exchange position, translate the article radially outward from the mast axis, and lower the article onto the article holder; and wherein the transfer mechanism is further configured to lift an article off the article holder, translate the article radially inward toward the mast axis, and lower the article onto an article-holding fixture in its exchange position.

* * * * *